US007621056B2

(12) United States Patent
Iso

(10) Patent No.: US 7,621,056 B2
(45) Date of Patent: Nov. 24, 2009

(54) RULER

(75) Inventor: Nobuaki Iso, Okegawa (JP)

(73) Assignee: Yugen-Kaisya Tapiro, Okegawa-shi (JP)

( * ) Notice: Subject to any disclaimer, the term of this patent is extended or adjusted under 35 U.S.C. 154(b) by 121 days.

(21) Appl. No.: 11/899,121

(22) Filed: Sep. 4, 2007

(65) Prior Publication Data

US 2009/0056155 A1 Mar. 5, 2009

(51) Int. Cl.
*G01B 3/02* (2006.01)
*B43L 7/00* (2006.01)

(52) U.S. Cl. .......................................... 33/483; 33/493

(58) Field of Classification Search ................... 33/483, 33/484, 489, 492, 493
See application file for complete search history.

(56) References Cited

U.S. PATENT DOCUMENTS

| | | | | | |
|---|---|---|---|---|---|
| 422,033 | A * | 2/1890 | Nisley | 33/484 |
| 742,013 | A * | 10/1903 | Dunn | 33/489 |
| 806,546 | A * | 12/1905 | Lawless | 33/493 |
| 1,255,251 | A * | 2/1918 | Waters | 33/483 |
| 2,579,664 | A * | 12/1951 | Gleasman | 33/492 |
| 4,924,594 | A * | 5/1990 | Fernandes | 33/483 |
| 5,371,952 | A * | 12/1994 | Williams | 33/430 |
| 6,145,210 | A * | 11/2000 | Walczynski | 33/458 |
| 6,314,653 | B1 * | 11/2001 | Iso | 33/484 |
| 7,490,412 | B1 * | 2/2009 | Gupta | 33/492 |
| 2005/0086819 | A1 * | 4/2005 | Ollgaard et al. | 33/483 |
| 2007/0204476 | A1 * | 9/2007 | Brothers | 33/483 |

FOREIGN PATENT DOCUMENTS

| | | | |
|---|---|---|---|
| JP | 11011087 | A * | 1/1999 |
| JP | 2000-79794 | A | 3/2000 |
| JP | 2001-162988 | A | 6/2001 |
| JP | 2003246191 | A * | 9/2003 |
| JP | 2004090601 | A * | 3/2004 |

* cited by examiner

*Primary Examiner*—R. Alexander Smith
(74) *Attorney, Agent, or Firm*—Frishauf, Holtz, Goodman & Chick, P.C.

(57) ABSTRACT

A ruler in which one pair of parallel cuts are put in one raw material plate, a supporting point part is formed by narrowing both ends of the parallel cuts or making the both ends like a fork, a bent cut or a linear cut reaching to an end part of the raw material plate is put so as to surround the supporting point part or extend along it, and an arch part, in which a part included between the parallel cuts is bulged upward by heating, pressure friction, injection molding or chemical treating, is formed monolithically with the raw material plate, or made one in which a slip stop is applied wholly or partially in a back face of the arch part.

23 Claims, 27 Drawing Sheets

RULER

BACKGROUND OF THE INVENTION,

1. Field of the Invention

The present invention relates to a ruler used for writing a line or cutting by a cutter, and especially relates to an improvement in a ruler which is contrived such that it can be closely contacted with a surface of an object article such as paper or cloth, and in which there generates no unexpected situation such as positional displacement when using a writing tool or the cutter.

2. Description of the Related Art

From olden times, in the ruler there exist, beside general one for depicting a straight line, various ones such as a triangular ruler used by combining two, a circular ruler, an elliptic ruler, a curved ruler, a T square, a parallel ruler attached to a drawing table, and additionally a template for depicting a letter or a pattern.

This conventional ruler is formed usually by a flat plate of a wood material, a bamboo material, a metal or the like, including a plastic, and made one plane-contacted with a surface of the object article whose line is desired to be drawn and depicted. And, in a case drawing the line by using this ruler, it follows that there is performed by pressing the ruler from above by fingertips of one hand, holding the writing tool with the other hand, and moving a tip of that writing tool along an edge of the ruler.

Here, since the fingertips pressing the ruler are difficult to be extended over a whole of the ruler and they become a form of points, this pressed portion becomes a supporting point, and a pressing by the writing tool in a portion spaced from this supporting point becomes an action point, so that there occurs also such a situation that the ruler is rotated. Strengthening a pressing force in order to prevent this becomes one compelling a feeling of fatigue to a work.

Whereupon, the inventor proposed a ruler in which a positioning of the ruler and a positional movement of the ruler could be smoothly performed by arranging an arch member having a spring property in a surface of the ruler, and protruding downward a slip stop member while interlocking with a pressing of that arch member (refer to Patent Documents 1 and 2).

Patent Document 1: JP-A-2000-79794 Gazette

Patent Document 2: JP-A-2001-162988 Gazette

An issue that the present invention is to solve exists in a point that, although the ruler previously developed by the inventor can certainly suppress the rotation of the ruler at a work time and thus can smoothly perform the positional movement as well, a constituent component number increases, its constitution becomes complicated, manufacturing processes are many, and therefor a cost rises as well.

Additionally, the issues exist in points that when there is made a constitution in which, by using the arch member having the spring property, it is pressed into an opening formed in a ruler main body, there occurs a backlash if there is a slight dimensional difference between the arch member and the opening, and that there is also a fear that, if a biased force is applied to the arch member, there occur a twist and a lateral displacement resulting from the twist.

SUMMARY OF THE INVENTION

In order to solve these issues, a ruler concerned with the present invention is one in which one pair of parallel cuts are put in one raw material plate, a supporting point part is formed by narrowing both ends of the parallel cuts or making the both ends like a fork, a bent cut or a linear cut reaching to an end part of the raw material plate is put so as to surround the supporting point part or extend along it, and an arch part, in which a part included between the parallel cuts is bulged upward by a working means such as heating, pressure friction, injection molding or chemical treating, is formed monolithically with the raw material plate, or one in which a slip stop is applied wholly or partially in a back face of the arch part, or one in which the slip stop is made a paint, and a letter or a pattern is expressed by the paint, or the slip stop is made a rubber sheet, and a letter or a pattern is carved thereon and expressed.

Further, a ruler concerned with the present invention is one in which one pair of parallel slits are put in one raw material plate, a through-hole having various shapes is formed continuously with the slits, an arch part, in which a part included between the one pair of parallel slits is bulged upward by a working means such as heating or pressure friction, is formed monolithically with the raw material plate, and a strain is relieved by absorbing, by the through-hole, a reaction force of a pressing force exerted on the arch part, and raising upward an end part of the arch part, or one in which a template is formed by the through-hole, or one in which, instead of the through-hole, an expansion/contraction material such as sponge or rubber sheet is connected to the end of the arch part, and the strain is relieved by the expansion/contraction material.

Additionally, a ruler concerned with the present invention is one in which one pair of parallel slits are put in one raw material plate, an arch part, in which apart included between the slits is bulged upward by a working means such as heating or pressure friction, is formed monolithically with the raw material plate, slits are put continuously with the former slits at about 30 degrees-60 degrees in four corners of the arch part, and cuts are put also in four corners of the raw material plate at about 45 degrees, or one in which one pair of parallel slits are put in one raw material plate, an arch part, in which a part included between the slits is bulged upward by a working means such as heating or pressure friction, is formed monolithically with the raw material plate, and a mountain-shaped bent protrusion part is formed near at least one end part of the arch part, or one in which an about half of a length of one long square raw material plate is made an about half width while being made near an inside, an arch part is formed by folding back its half width portion to an upper face direction of a wide width portion, respective free ends of the arch part and the wide width portion are fixed in a vertical direction, and an approximately mountain-shaped bent protrusion part is formed near the fixed part of the arch part.

Further, a ruler concerned with the present invention is one in which one pair of parallel cuts are put in one raw material plate, cuts for a strain relief are put in end parts of the former cuts, an arch part, in which a part included between the one pair of parallel cuts is bulged upward by a working means such as heating or pressure friction, is formed monolithically with the raw material plate, and additionally a different arch part is monolithically overlapped to and formed in the former arch part, or one in which an about half of a length of one long square raw material plate is made an about half width while being made near an inside, its half width portion is folded back upwardly of a wide width portion to thereby make the folded-back half width portion into an arch part, and a free end of the arch part is made so as to be capable of sliding in a gate part formed in an end part of the wide width part.

Additionally, a ruler concerned with the present invention is one in which an approximately U-shaped slit or a slit continuous with the former slit at about right angle is put in a raw material plate, and a part surrounded by the slit is made an arch part or a leaf spring part, or one in which both ends of a long square raw material plate are folded back, a reception part of an arch part is formed in at least one of the folded-back ends, and there is possessed the arch part in which an engaging part, whose tip is bent upward, is engaged with the reception part.

Further, a ruler concerned with the present invention is one in which plural raw material plates are rotatably connected in one corner of each of the raw material plates.

And, a ruler concerned with the present invention is one in which a separate arch spring member is mounted on the raw material plate and, in a back face of the arch spring member, there is formed a box part receiving a strain relief portion formed by cuts, or one in which an end part of the arch spring member is engaged with a long hole in a vertical direction of a bracket, which is vertically provided in the raw material plate, by a shaft, and the shaft is made a constitution corresponding to an arch part formed in a most end part.

Since the ruler concerned with the present invention is constituted as mentioned above, it is excellent in its positioning stability at the work time, not only there is no fear that the backlash and the lateral displacement occur but also it becomes possible to remarkably reduce the component number, and the manufacturing processes becomes simple ones, so that it follows that a product can be supplied to a prospective consumer at a low cost.

DETAILED DESCRIPTION OF THE INVENTION

Figure 1:
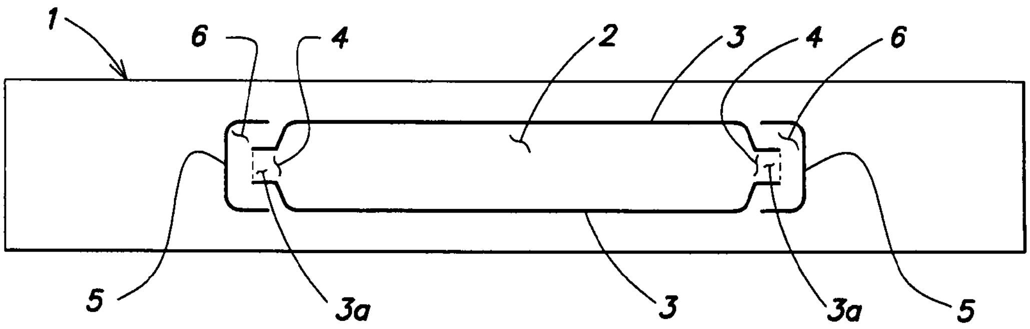
FIG. 1 is a plan view showing a ruler in which the present invention is implemented.
Figure 2:
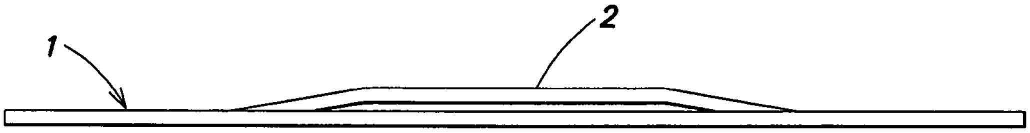
FIG. 2 is a front view.
Figure 3:
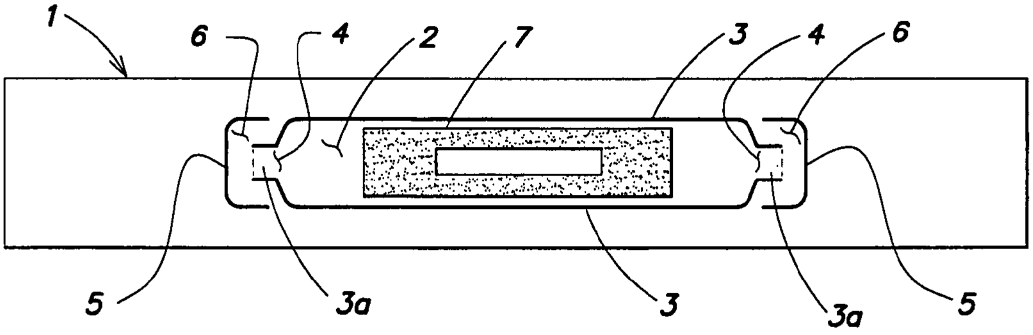
FIG. 3 is a bottom view.

The present invention is realized by constituting like embodiments shown as the drawings.

Next, preferred embodiments of the present invention are explained by referring to the drawings.

In the drawings, 1 denotes a ruler main body. Although this ruler main body 1 is formed from a rectangular raw material plate mainly by a plastic, this material is one capable of being formed also by a metal, a bamboo material, a wood material, a paper material, or the like, besides the plastic. Further, it is of course that this ruler main body 1 becomes so as to be used also as a scale by putting a graduation in a side edge along a longitudinal direction.

In this ruler main body 1, there is monolithically formed an arch part 2 whose center portion is bulged upward in an approximately center inside along the longitudinal direction. This arch part 2 is formed by putting one pair of parallel cuts 3, 3 along the longitudinal direction of the raw material plate, and deformation-working a part included between the parallel cuts 3, 3 by a working means such as heating, pressure friction, injection molding, or chemical treating.

Further, in the cuts 3, 3, there are formed, in their both ends, supporting point parts 4, 4 by being narrowed in their widths, and fronts of the supporting point parts 4, 4 are made small piece parts 3*a*, 3*a*. That is, in the present embodiment, a portion contained between chain lines in FIG. 1 becomes a portion actually forming an arch. Additionally, approximately U-shaped cuts 5 are put so as to surround the supporting point parts 4, 4 and the small piece parts 3*a*, 3*a* contiguous to the formers and, by these cuts 5, strain relief pieces 6, 6 are formed.

Additionally, in a back face of the arch part 2, there is provided a slip stop 7. This slip stop 7 can be implemented also by means printing a paint becoming a soft slip stop, besides adhering a sheet whose friction coefficient is large, such as rubber sheet, by an adhesive, a double-sided adhesive tape, or the like. And, in a case where the slip stop of this sheet is used, in one made like a frame or the like, rather than solid one of one piece, supporting points are liable to be dispersed and fixed. In this case, such a matter is also possible as to depict a letter, a pattern or the like by this paint to thereby make a novelty, and an expression of the letter or the pattern becomes possible also by engraving it to the rubber sheet.

Figure 4:
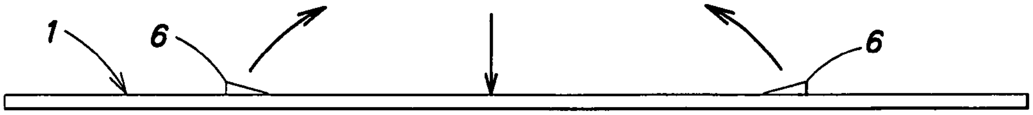
FIG. 4 is a front view showing a state at a use time.
Figure 5:
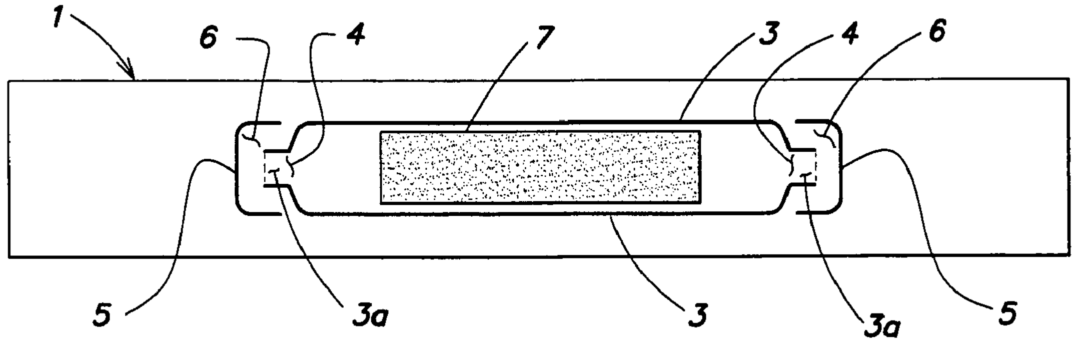
FIG. 5 is other bottom view.

The ruler main body 1 concerned with the present embodiment is constituted like the above and, when used if this ruler main body 1 is mounted on a paper face or the like, which becomes an object, and the arch part 2 is pressed, the arch part 2 enters into an opening part formed by the cuts 3, 3, and the slip stop 7 contacts with the paper face or the like and is positioned. There is made such that, on this occasion, a volume becoming excessive by the fact that the arch part 2 enters into the opening part is transmitted to the strain relief pieces 6, 6 as a stress, and the stain relief parts 6, 6 are lifted upward as shown in FIG. 4, so that no influence is exerted on a work part of the ruler main body 1.

In a case where the raw material plate is molded by the plastic and it is a long square, since it flexes if a wall thickness is thin, it is possible to adjust a spring property of the arch part 2 by making the thickness into a thickness of about 5 mm, and making a back face extending from the arch part 2 and the supporting point part 4 to the strain relief piece 6 into a wall thickness of about 3 mm by cutting 8. Incidentally, in a case of this long square one, it is also possible to form the arch part 2 while being intermittently continued in the longitudinal direction, and there can be made also a constitution in which a strain relief piece 6*a* in a most end of the ruler main body 1 is made parallel cuts 5*a*, not the U-shaped form, and these cuts are formed till an end part of the ruler main body 1. Incidentally, even as to one whose raw material plate is thick and which is a long square, if a width is wide and the arch part is long, it is not necessary to add a cutting working especially.

Further, FIG. 9 to FIG. 13 show an embodiment possessing a handle 9. In a case of FIG. 9 to FIG. 13, parallel cuts 3*c*, 3*c*—are additionally, intermittently linearly put in the arch part 2 formed as mentioned above to thereby form separate arch parts 2*a*, 2*a*, and back faces of the arch parts 2*a*, 2*a* possess respectively such slip stops 7*a*, 7*a* as mentioned before. And, the U-shaped handle 9 is provided while being included between apex faces of the arch parts 2*a*, 2*a*. When providing this handle 9, one arch part 2*a* becomes one in which a long hole 10 for the strain relief is formed.

Figure 12:
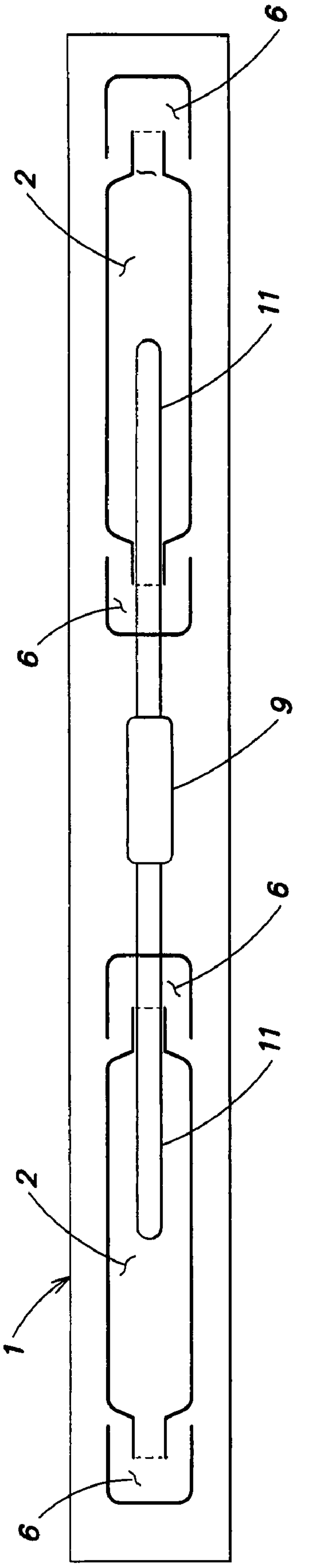
FIG. 12 is a plan view showing a modified example.
Figure 13:
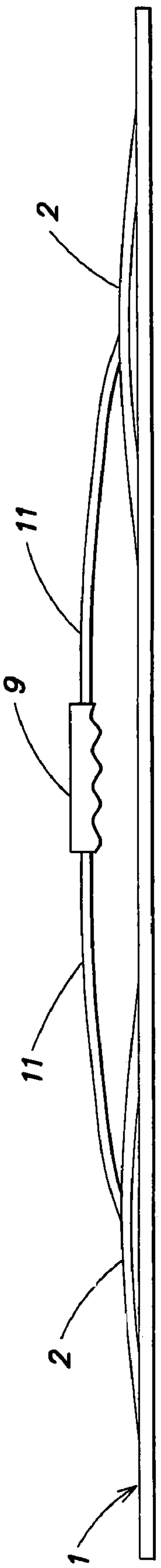
FIG. 13 is a front view.

A case of FIG. 12 and FIG. 13 is an example in which the arch parts 2, 2 are formed by two along the longitudinal direction, and there is explained with also the reference numeral in the drawings being appended only to a main point. This case of FIG. 12 and FIG. 13 is one in which end parts of work levers 11, 11 extendedly provided like a bow from the handle 9 are fixed between the apex faces of the two arch parts 2, 2 and, as the strain relief, it follows that the strain relief pieces 6, 6 lifted continuously to the arch parts 2, 2 act.

Figure 14A:
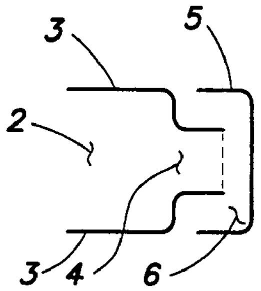
FIGS. 14A and FIG. 14B are views showing respectively a cut of strain relief.
Figure 14B:
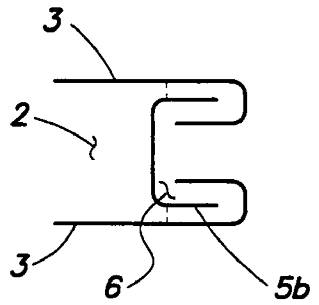

And, FIG. 14A to FIG. 16C are examples of the cut for the strain relief, and FIG. 14A is as mentioned before. A case of FIG. 14B is one in which the cuts 3, 3 are extended, and their tips are direction-turned inward by 180 degrees, and becomes one in a case where there is put a U-shaped cut 5*b* whose direction is reversed to FIG. 14A so as to surround the narrow small piece part 3*a* formed there, the strain relief piece 6 is formed while being included between parallel small pieces, and a force exerted on the arch part 2 acts in a lateral direction.

Figure 15A:
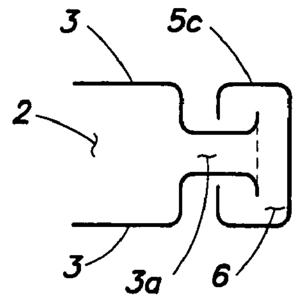
FIGS. 15A to FIG. 15C are views showing respectively the cut of strain relief.
Figure 15B:
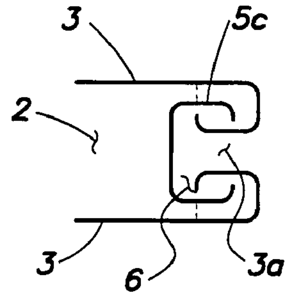
Figure 15C:
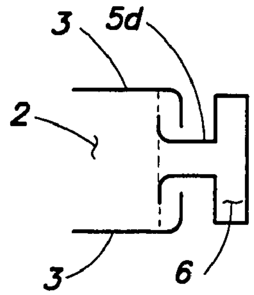

FIG. 15A to FIG. 15C are examples of the strain relief in which the exerted force becomes lateral/longitudinal by a later-mentioned shape of the arch part or its combination. In FIG. 15A, although the small piece part 3*a* is formed with the cuts 3, 3 being narrowed, tips of the cuts 3, 3 are respectively bent outward to thereby put an approximately rectangular cut 5*c* whose one part is opened so as to surround a periphery of the small piece part 3*a*, thereby forming the strain relief piece 6. FIG. 15B is a constitution corresponding to FIG. 14B, and the cut 5*c* of FIG. 15A is put in a reverse direction, and the strain relief piece 6 is formed in an inside of the arch part 2. In a case of FIG. 15C, both ends of the cuts 3, 3 are bent inward at about right angle, and between them a T-shaped part, whose hem spreads outward in an end part of the arch part 2, is formed by a cut 5*d*, and it is made the strain relief piece 6.

Figure 16A:
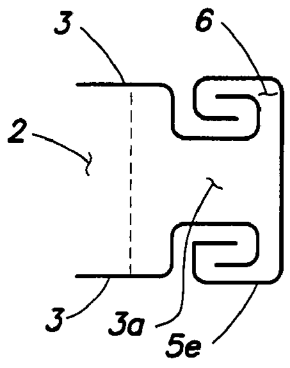
FIGS. 16A to FIG. 16C are views showing respectively the cut of strain relief.
Figure 16B:
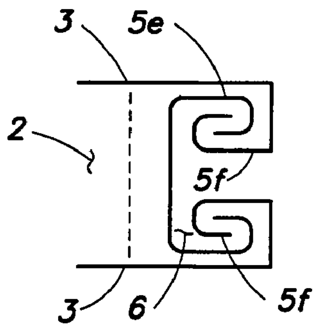
Figure 16C:
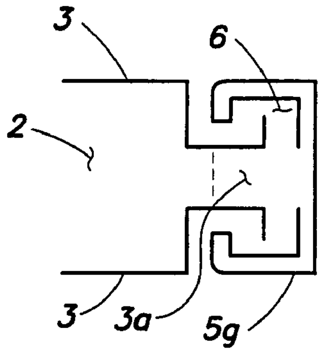

Further, cases of FIG. 16A to FIG. 16C are examples of the strain relief in which the exerted force becomes lateral/longitudinal/lateral. In a case of FIG. 16A, the tips of the cuts 3, 3 are narrowed to thereby form the narrow small piece part 3*a*, and additionally its front is bent so as to turn around outward. And, a periphery of its bent portion is made an approximately U-shaped form, and there is put a cut 5*e* bent such that its tip is turned around to an inside, thereby forming the strain relief piece 6. In a case of FIG. 16B, the above cut 5*e* is put in a reverse direction in the end part of the arch part 2, and cuts 5*f*, 5*f* are symmetrically put such that their tips are made so as to turn around outward toward an inside of the cut 5*e*, thereby forming the strain relief piece 6. In a case of FIG. 16C, the tips of the cuts 3, 3 are narrowed to thereby form the small piece part 3*a*, and its tip is additionally bent outward at about right angle. And, in its periphery, a cut 5*g* becoming approximately reverse C-shaped form is doubly put in such a manner as to be drawn with a single stroke of a pen and, by the fact that the cut 5*g* is made discontinuous in a center part of its inside, the strain relief piece 6 is formed.

Figure 6:
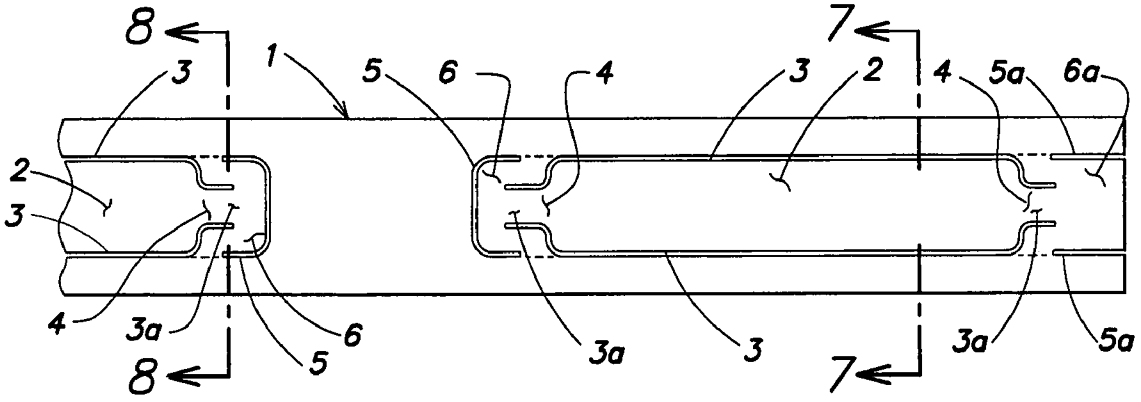
FIG. 6 is a partial plan view showing other example.
Figure 7:
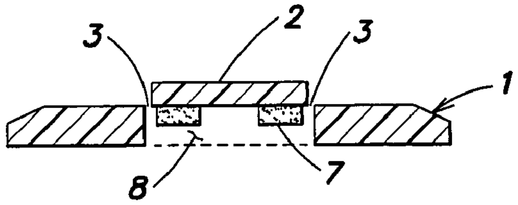
FIG. 7 is a sectional view along line 7-7 in FIG. 6.
Figure 8:
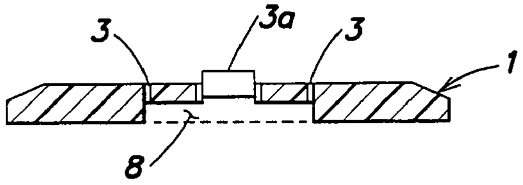
FIG. 8 is a sectional view along line 8-8 in FIG. 6.
Figure 9:
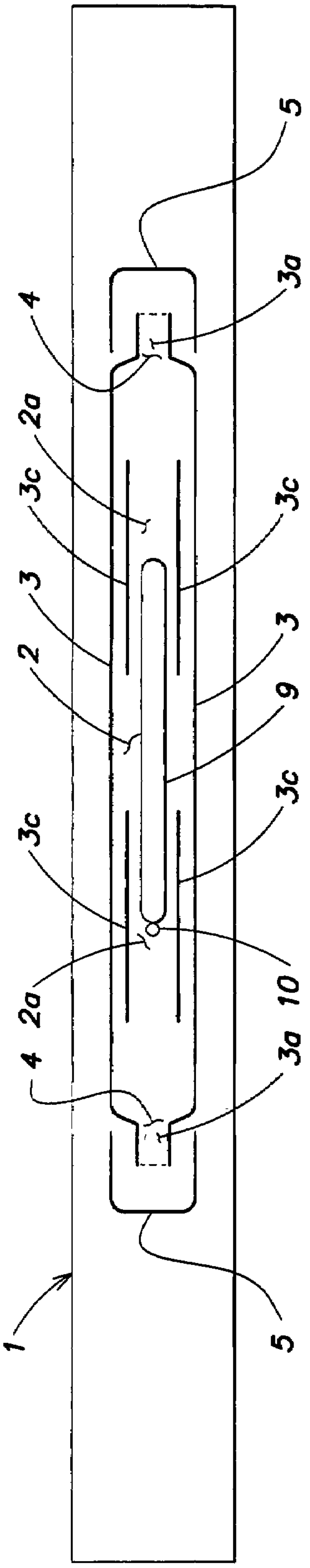
FIG. 9 is a plan view showing other example.
Figure 10:
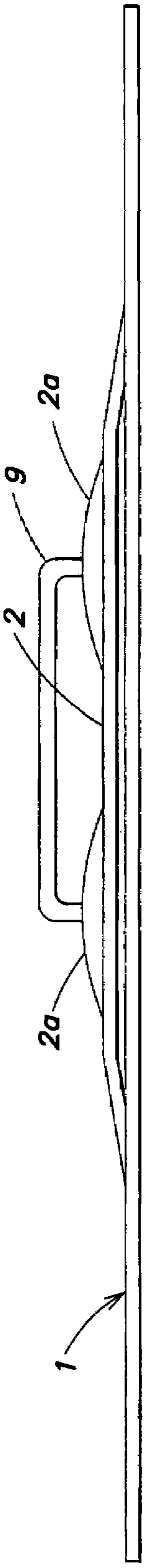
FIG. 10 is a front view.
Figure 11:
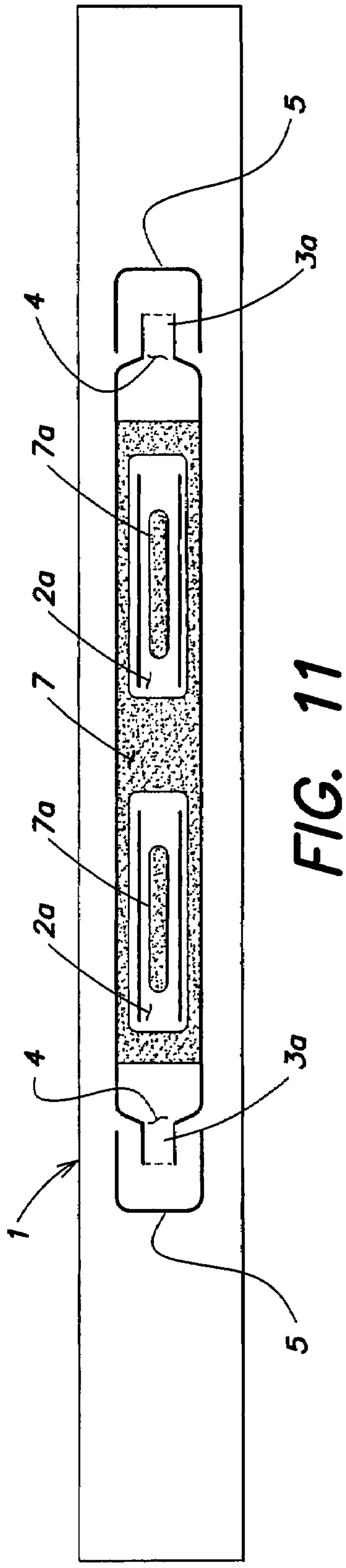
FIG. 11 is a bottom view.
Figure 17A:
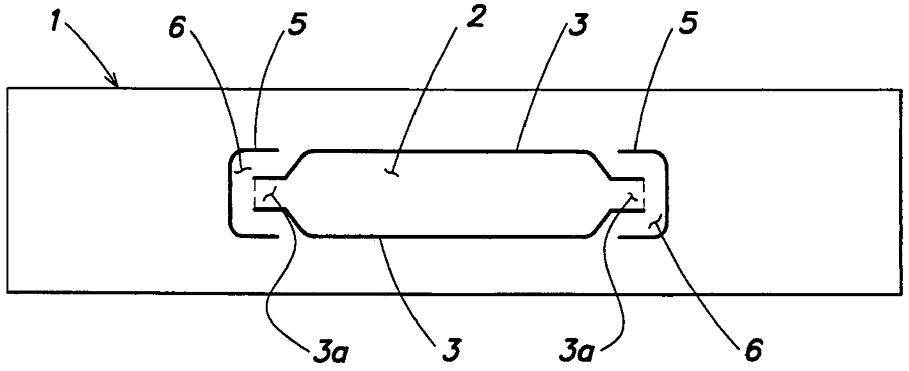
FIGS. 17A to FIG. 17E are plan views showing respectively each example of a ruler in which the cut of strain relief is put.
Figure 17B:
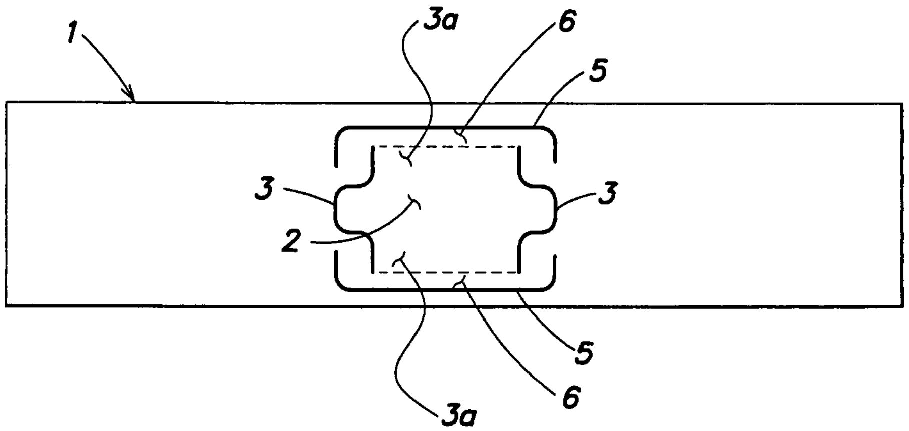
Figure 17C:
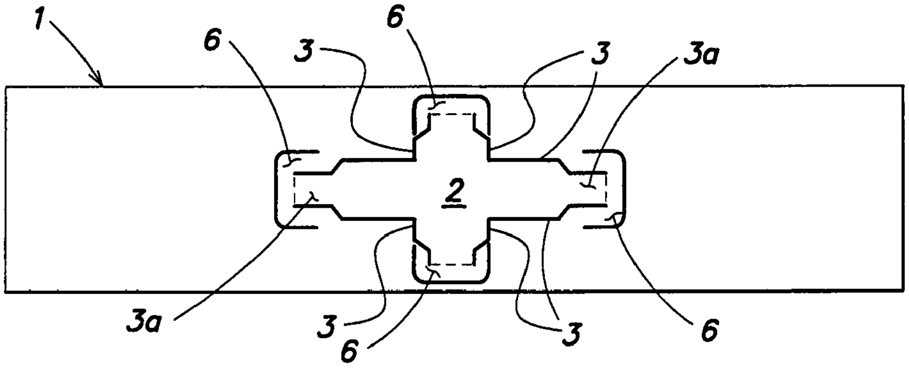
Figure 17D:
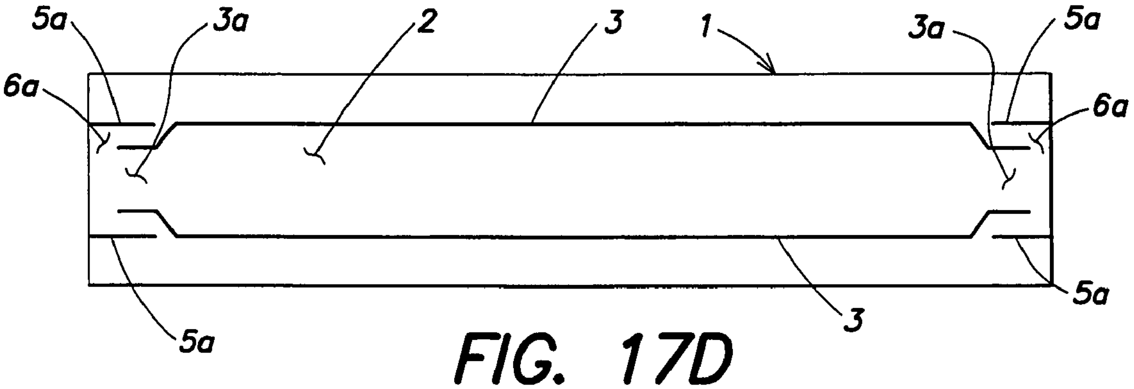

Additionally, FIG. 17A to FIG. 17E are ones showing the ruler main bodies 1, 1—in which the structure of the above strain relief is applied and implemented. Especially, the type of FIG. 14A is shown in FIG. 17A to FIG. 17C. Although a case of FIG. 17A is the same type as one shown in FIG. 1 to FIG. 5, a case of FIG. 17B is a type in which the arch part 2 is formed along a short hand direction of the ruler main body 1, in other words, in a longitudinal direction, and a case of FIG. 17C is a type in which ones shown in FIG. 17A and FIG. 17B are combined, and thus the arch part 2 is formed like a cross. Further, a case shown in FIG. 17D is one of a type in which the already mentioned one shown in FIG. 6 is constituted with the arch parts 2 being made one. In a case of FIG. 17E, a monolithic band material is formed by cutting a center portion of the raw material plate along the longitudinal direction, and the arch part 2 is formed by folding back that band material to the ruler main body 1 side. As to this folded-back part, a base end is made a step-like part 2*b*, and its tip is made the step-like part 2*b* as well, and its inner part vicinity is welded in a vertical direction. That is, in this constitution, if the arch part 2 is pressed, the above-mentioned step-like part 2*b* acts as the strain relief part relieving upward. Incidentally, a width difference from the ruler main body 1, for forming this arch part 2, may not exist.

Figure 18A:
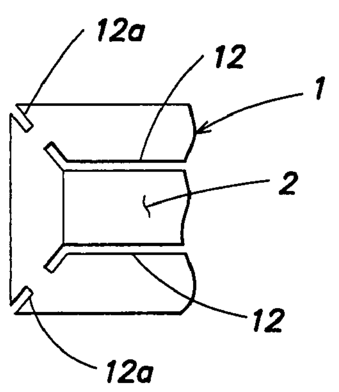
FIGS. 18A and FIG. 18B are views showing respectively other cut of strain relief.
Figure 18B:
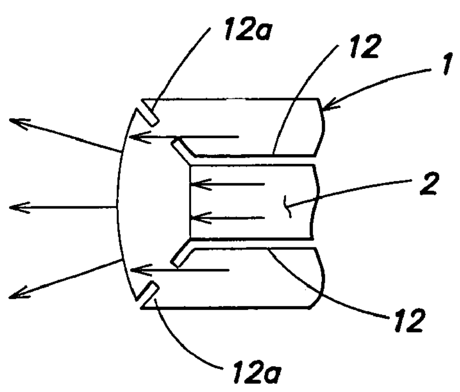

Further, in the ruler main body 1 shown as FIG. 18A and FIG. 18B, one pair of slits 12, 12 having slightly an interstice than the cuts 3, 3 are provided parallel, and a part between the slits 12, 12 is formed to the arch part 2 by such a method as mentioned before. The slits 12, 12 are continuously bent outward respectively in their tip portions by about 45 degrees and, additionally also in four corners of the ruler main body 1, there are provided slits 12*a*, 12*a* whose one ends are opened at about 45 degrees. In the ruler main body 1 of this constitution, if the arch part 2 is pressed, its pressing force is exerted on both ends of the arch part 2, and relieved by the slits 12, 12*a*, thereby bulging both end parts of the ruler main body 1 as shown in FIG. 18B. A force action of this acts linearly act to a work part for drawing a line as a tension, so that the work part can be made more linear. Incidentally, formation angles of the slits 12, 12, 12*a*, 12*a* can be arbitrarily designed in a rage of about 30 degrees-60 degrees.

Figure 19:
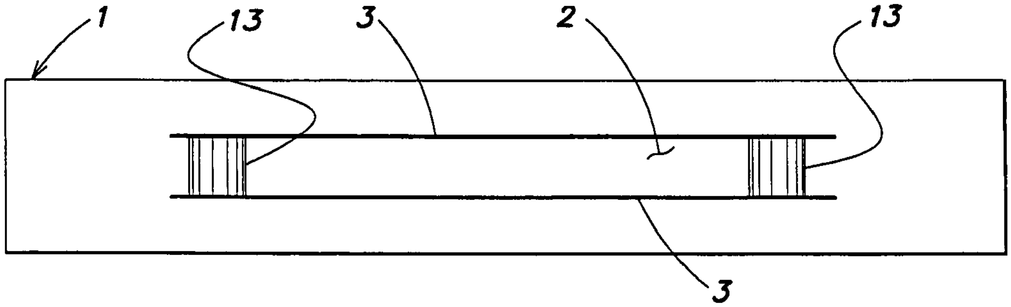
FIG. 19 is a plan view of a ruler having a constitution of other strain relief.
Figure 20:
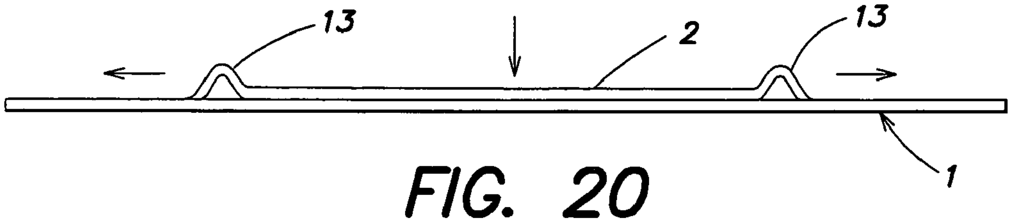
FIG. 20 is a front view.

In the ruler main body 1 shown in FIG. 19 and FIG. 20, protrusion parts 13, 13, each of which is upwardly mountain-shaped, are monolithically formed near both ends of the arch part 2 formed on a center portion by the cuts 3, 3. In this constitution, if the arch part 2 is pressed, its pressing force is absorbed by the protrusion parts 13, 13, so that it follows that a strain is relieved.

Figure 21:
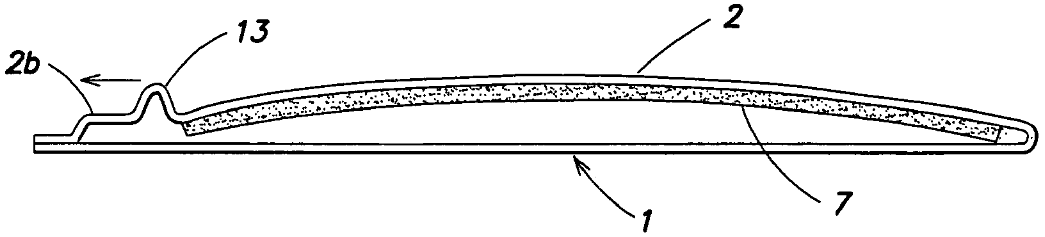
FIG. 21 is a front view showing other example.
Figure 22:
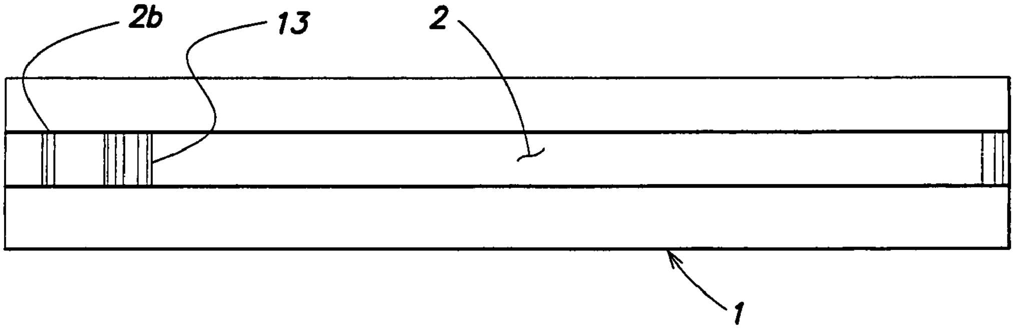
FIG. 22 is a plan view.

Additionally, the ruler main body 1 shown in FIG. 21 and FIG. 22 is one in which the raw material plate made the long square is folded back and overlapped in its approximate center, and its upper face portion is made the arch part 2. In this case, there is made a constitution in which a tip portion of the arch part 2 forms the step part 2*b*, a leading tip is fixed to a lower face (ruler main body 1) by using a small screw or an adhesive to thereby monolithically form the upwardly mountain-shaped protrusion 13 near the step part 2*b* and, if the arch part 2 is pressed, its pressing force is absorbed by the protrusion part 13, thereby relieving the strain.

Figure 23:
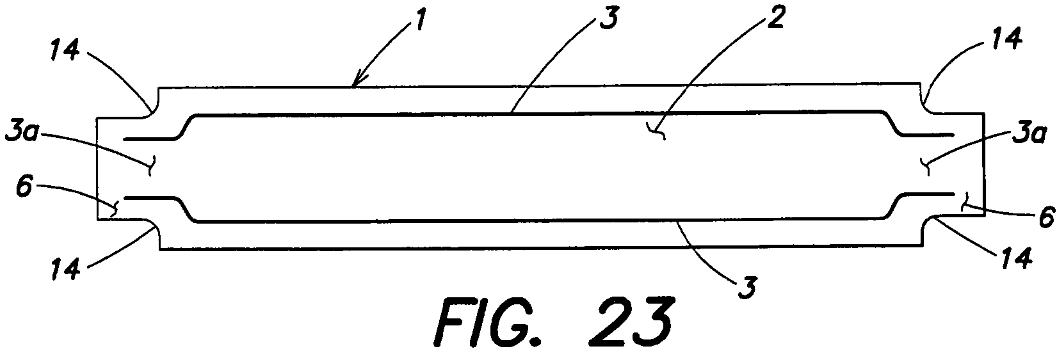
FIG. 23 is a plan view of a ruler in which there is made such that no strain generates without providing the cut.
Figure 24:
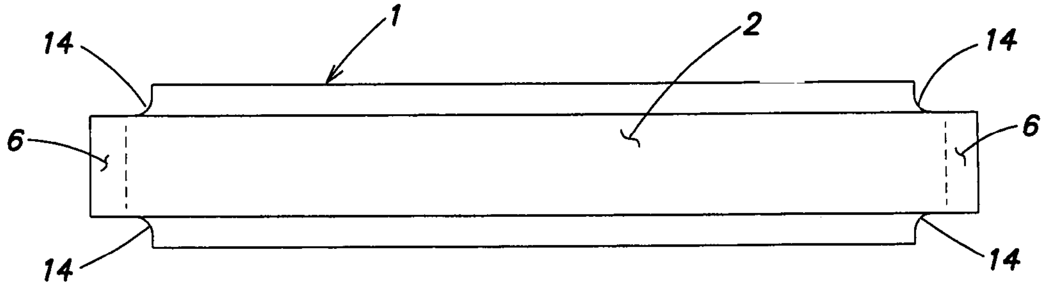
FIG. 24 is a plan view showing a ruler made a two-piece type by being folded back.

The ruler main body 1 shown in FIG. 23 has the arch part 2 formed by the cuts 3, 3 and, in four corners of the ruler main body 1, there are formed R-like notches 14, 14—becoming symmetrical. In this constitution, if the arch part 2 is pressed, portions contained between the notches 14, 14 act as the strain relief pieces 6, 6 and, by being lifted, it is possible to relieve the strain. Further, in a case shown in FIG. 24, although a constitution in which the notches 14, 14—are formed in the four corners of the ruler main body 1 is similar the constitution when shown by FIG. 23, the arch part 2 is one which is constituted by folding back the raw material plate in its approximate center, and in which its tip is fixed to a lower face portion by a fixation means, and becomes one in which both ends of the ruler main body 1 including the arch part 2 perform an action of the strain relief pieces 6, 6, and are lifted upward.

Figure 25A:
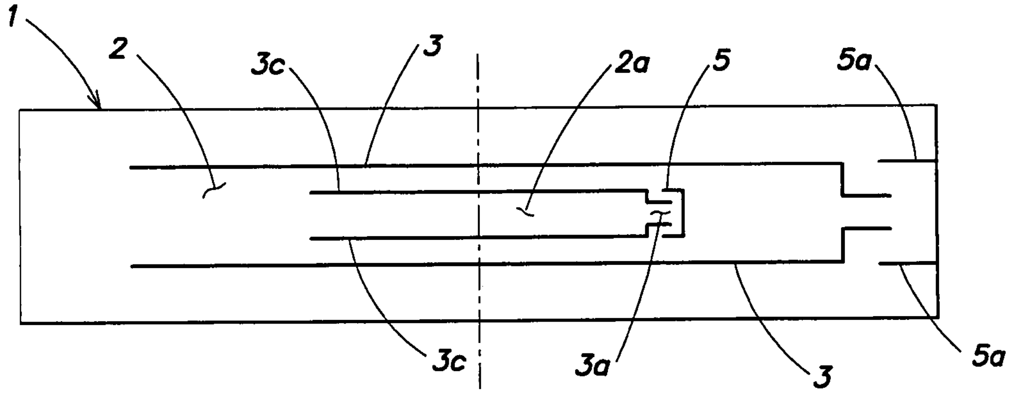
FIGS. 25A and FIG. 25B are views showing respectively an example in which arch parts are overlapped and the strain relief is provided in one.
Figure 25B:
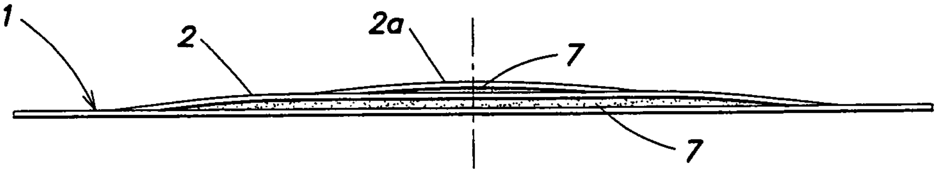

Further, in FIG. 25A and FIG. 25B, there is shown an example in which the arch part is formed while overlapping. In such a form, it follows that various ones of the above-mentioned structure are applied and added to a strain relief structure. The arch part 2 formed by the cuts 3, 3 is formed in the ruler main body 1 shown in FIG. 25A and FIG. 25B, and additionally the cuts 3*c*, 3*c* are put parallel in a center portion of the arch part 2, and the arch part 2*a* is formed separately (refer to FIG. 9 to FIG. 13).

Incidentally, in FIG. 25A and FIG. 25B, a center line is provided by an alternate long and short dash line, and it follows that, in a side in which the cut 5 is not provided with this center line being made a boundary, the end part of the ruler main body is lifted.

Figure 26A:
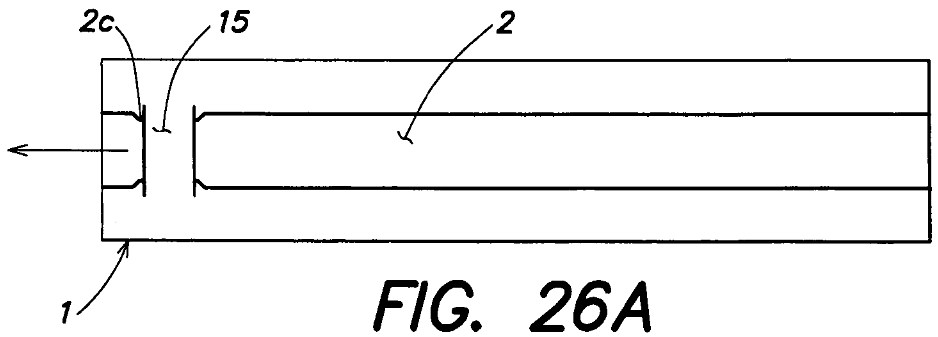
FIGS. 26A and FIG. 26B are views showing respectively a ruler possessing a strain relief function by being folded back and doubled.
Figure 26B:
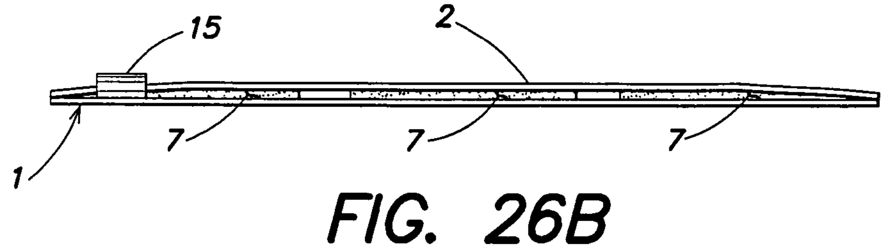

Further, in a case of the ruler main body 1 shown as FIG. 26A and FIG. 26B, an approximate half degree of the raw material plate made the long square is made a half width while being made an inner side and, by folding back it, the arch part 2 is formed. In a wide width portion of this, there are provided window holes (three in the present embodiment) through which the slip stops 7, 7—provided in the back face of the arch part 2 in a predetermined pitch can go in and out. A width-narrowed slide part 2*c* is formed in a free end side of the arch part 2, and this slide part 2*c* is inserted through a gate part 15 provided in a wide width part (ruler main body 1) while being monolithically cut up. That is, if the arch part 2 is pressed, its pressing force acts in a free end direction of the arch part 2, and it follows that the strain is relieved by the fact that the slide part 2*c* slides in the gate part 15.

Figure 27A:
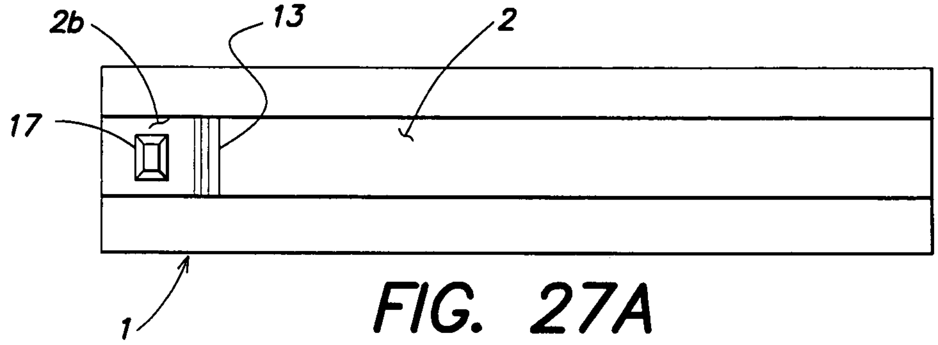
FIGS. 27A to FIG. 27C are views showing respectively other example.
Figure 27B:
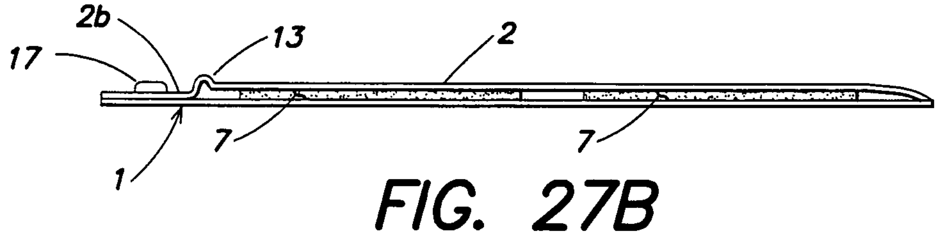
Figure 27C:
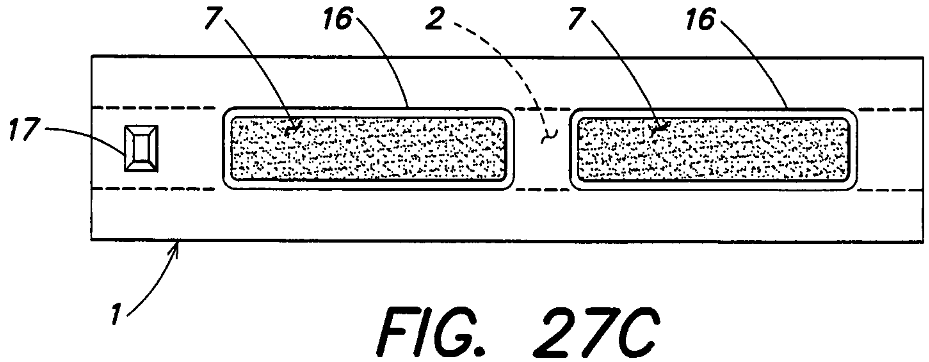

Although one shown as FIG. 27A to FIG. 27C is a constitution similar to the example shown in FIG. 21 and FIG. 22, in a case of FIG. 27A to FIG. 27C, in the wide width part (ruler main body 1) there are provided window holes 16, 16 through which the slip stops 7, 7 provided in the back face of the arch part 2 in the predetermined pitch can go in and out. In the free end side of the arch part 2, although there are formed the mountain-shaped protrusion part 13 for the strain relief and the step-like part 2*b*, in a case of an embodiment shown in FIG. 27A to FIG. 27C, by means such as ultrasonic welding there is formed a fixation part 17, which is like an approximately truncated quadrangular pyramid and whose inside is made hollow, by overlapping the step-like part 2*b* and the ruler main body 1 and protruding an upper part.

Figure 28:
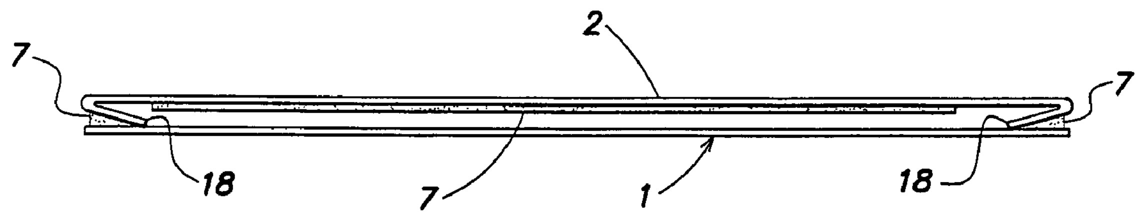
FIG. 28 is a view showing other example.

In a case of the ruler main body 1 shown as FIG. 28, although the arch part 2 is formed by folding back a half degree near an inside of the long square raw material plate while being made an approximately half width degree, in this case there is made a constitution in which warps 18, 18 are provided by putting the cuts in a folded-back part and the ruler main body 1 in the free end side, the tip of the arch part 2 is additionally folded back to an inside and connected to the warp 18, and the slip stops 7, 7 are possessed also in back faces of the warps 18, 18. That is, in the present embodiment, a whole shape of the arch part 2 becomes like a rugby ball, and the ruler main body 1 and the arch part 2 become the same expansion/contraction, so that there becomes a form in which there is no generation of the strain.

Figure 17E:
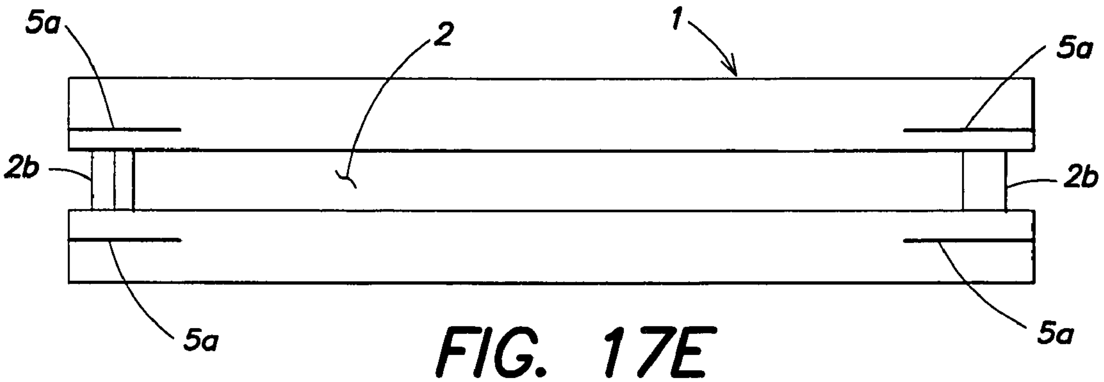
Figure 29A:
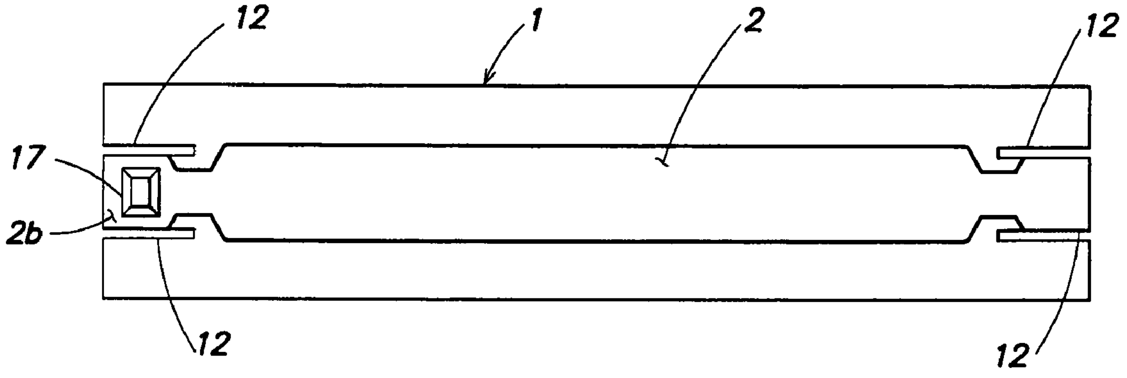
FIGS. 29A and FIG. 29B are views showing respectively other example.
Figure 29B:
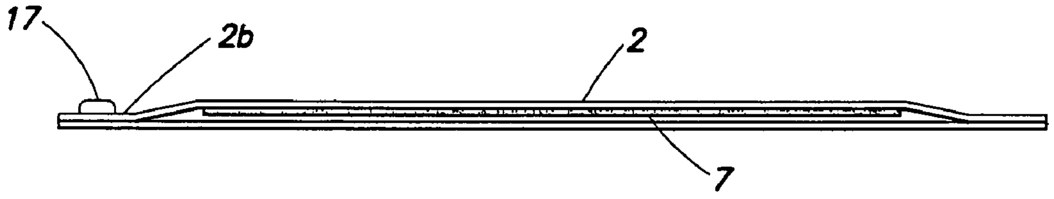

Further, the ruler main body 1 shown in FIG. 29A and FIG. 29B is a constitution similar to FIG. 17E and, although there is made a constitution in which an approximately half degree is folded back while being made an approximately half width degree to thereby form the arch part 2 similarly to the example shown in FIG. 27A to FIG. 27C, and the step-like part 2*b* in the tip of the arch part 2 is fixed by the fixation part 17, in a case of this example, the slits 12, 12 like a comb tooth are put in the ruler main body 1 along the folded-back portion and the step-like part 2*b*. The slits 12, 12 are long cut inside than the fixation portion and the folded-back portion and, by such a constitution, there is no fact that the strain occurs in the ruler main body 1 and a portion included between the slits 12, 12 lifts, thereby relieving the strain in the arch part 2. Incidentally, as to a folded-back shape, besides one shown in the drawing, there can be made a reverse direction, and also the welded fixation part 17 can be made other constitution.

The ruler main bodies 1 shown as FIG. 30 to FIG. 34 show types in which an edge undergoes a stress and persists. The ruler main body 1 shown in FIG. 30 becomes one in which both edges are bent downward such that a whole becomes an approximately U-shaped form, and is made a constitution in which one pair of intermittently continuous linear cuts 21, 21—are formed parallel to the both edges, a portion included between the parallel cuts 21, 21—is made a spring-like part 22, and the spring-like part 22 of the ruler main body 1 descends.

Figure 30:
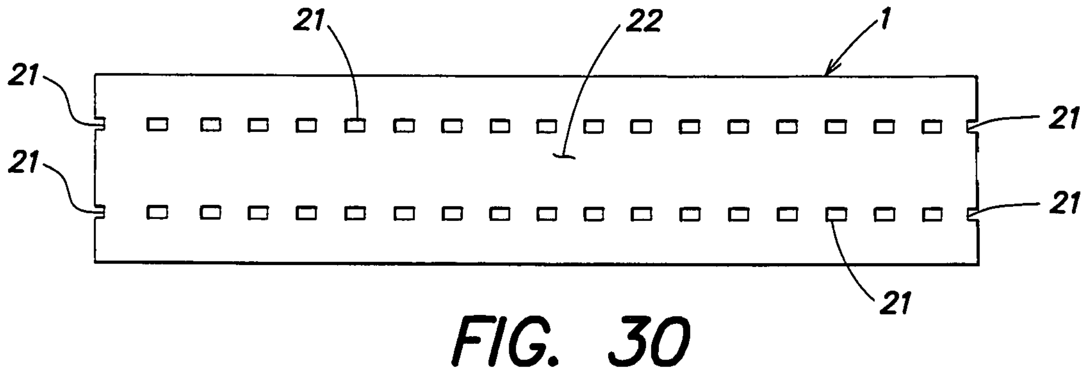
FIG. 30 is a view showing a type caused to have a spring function by bending a ruler main body.
Figure 31B:
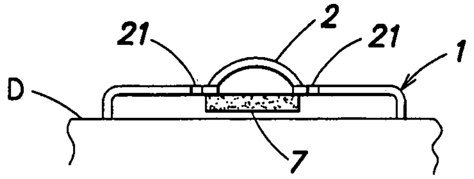
FIGS. 31A to FIG. 31C are views showing respectively other example.
Figure 31A:
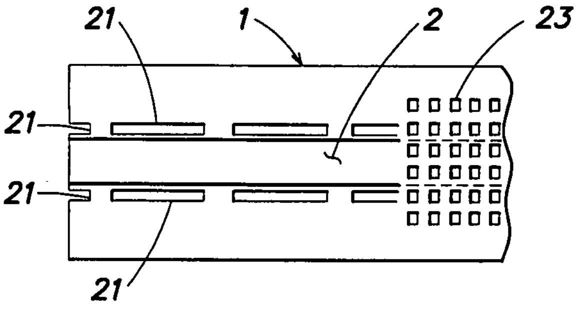
Figure 31C:
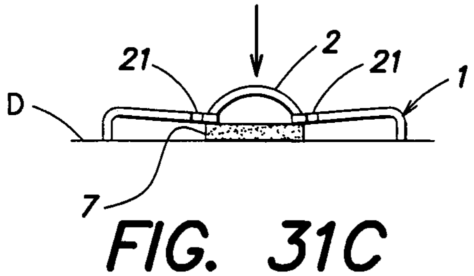

The ruler main body 1 shown as FIG. 31A to FIG. 31C is one in which the linear cuts are additionally put in an inside of the portion included between the cuts 21, 21—shown as FIG. 30, and by these cuts there is formed the arch part 2 becoming a longitudinal direction, and the slip stop 7 is arranged in a lower face of a formed opening. Further, as to bent portions of the both edges, it is also possible to add a reinforcing material to their insides. Additionally, it is also possible to form punching holes 23 in a ruler face, i.e., arch part 2, in combination with the cuts 21, 21—or instead of them. Of course, it is also possible to alter a directional property of the arch part 2 to a lateral direction.

Figure 32A:
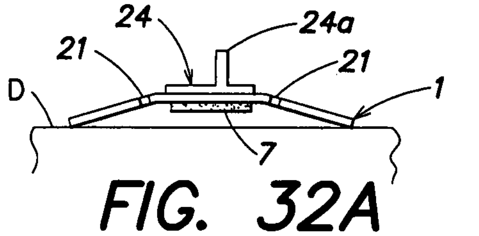
FIGS. 32A to FIG. 32C are views showing respectively other example.
Figure 32B:
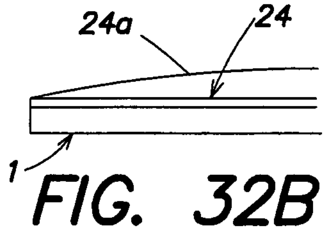
Figure 32C:
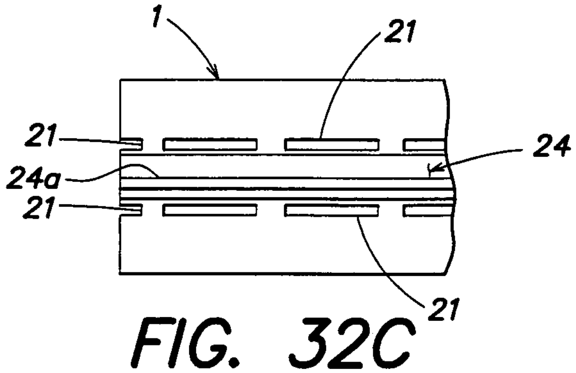
Figure 33A:
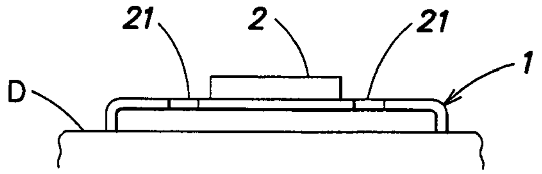
FIGS. 33A to FIG. 33 E are views showing respectively other example.
Figure 33B:
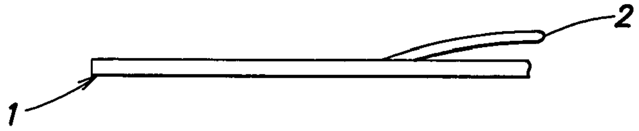
Figure 33C:
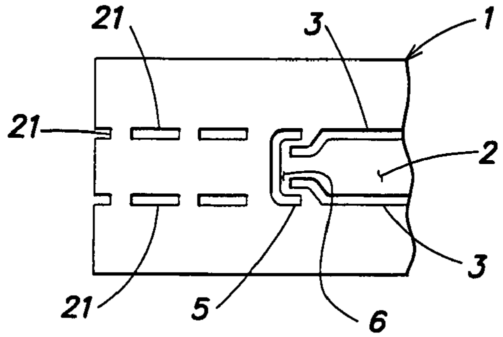
Figure 33D:
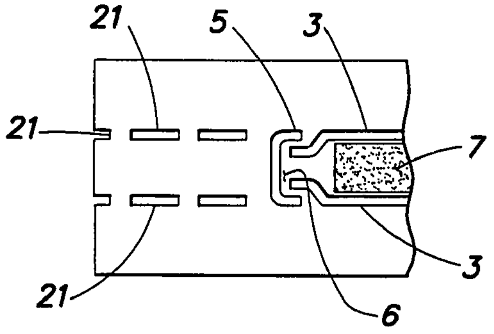
Figure 33E:
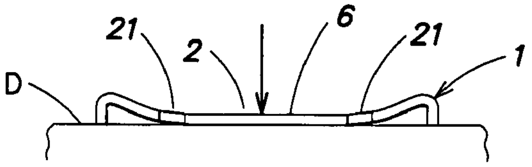

The ruler main body 1 shown as FIG. 32A to FIG. 32C is made a constitution in which both ends of the raw material plate are spread at obtuse angles, such cuts 21, 21 as mentioned above are provided along there to thereby cause a center site to retain a spring property, and the slip stop 7 is possessed in a lower face of the center site having the spring property. Further, in a surface of the center site, a pressing plate 24 for pressing the center site is possessed while being overlapped, and a rib 24*a* protecting a fingertip when using a cutter is monolithically provided in an upper face of the pressing plate 24.

The ruler main body 1 shown as FIG. 33A to FIG. 33E is one in which both edges are bent at about right angle, in its center site there is monolithically formed the arch part 2 formed by the cuts 3, 3 as mentioned above, and the strain relief piece 6 is formed by the cut 5, and the slip stop 7 is possessed in the back face of the arch part 2. Further, in this ruler main body 1, the above-mentioned cuts 21, 21—are formed on an extended line of the above-mentioned cuts 3, 3, and there is made one in which the ruler main body 1 is caused to have the spring property added to the arch part 2.

Figure 34:
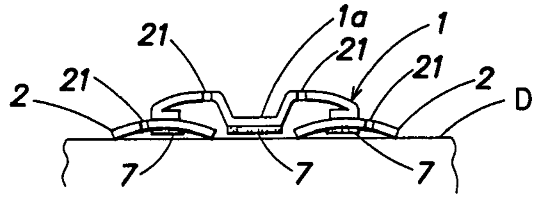
FIG. 34 is a view showing an example in which plural arches are combined.

The ruler main body 1 shown in FIG. 34 becomes a form in which plural arches are overlapped/combined. In this case, a center site 1*a* of the raw material plate is concaved downward, and the slip stop 7 is possessed in a back face of the center site 1*a*. Further, both edges of this ruler main body 1 is bent inward, and there is made one body article overlapped so as to extend over apex faces of one pair of the longitudinal direction arch members 2, 2 made different. The slip stops 7 are possessed also in the back faces of the arch members 2, 2. Further, near outer parts of the arch members 2, 2 and in a vicinity of the center site 1A of the ruler main body 1, there are provided such cuts 21, 21—as mentioned before, thereby being made one caused to retain a sufficient spring property as a whole.

Figure 35:
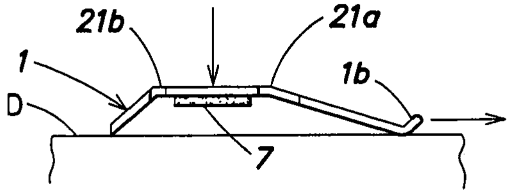
FIG. 35 is view showing an example in which bent angles in two places of the ruler main body are changed.
Figure 36A:
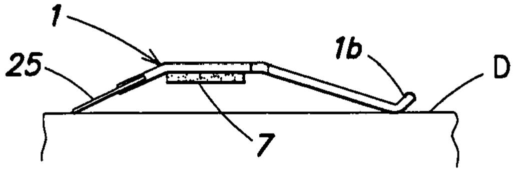
FIGS. 36A and FIG. 36B are views showing respectively other example.
Figure 36B:
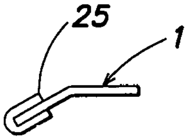
Figure 37:
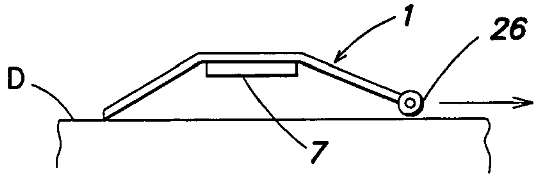
FIG. 37 is a view showing other example.

Further, in FIG. 35 to FIG. 37, there are shown types in which one side edge of the ruler main body 1 slides by the pressing, and the other becomes so as to undergo the stress and persist. In this case, both edges are bent downward at obtuse angles while being biased to one edge from a center of the raw material plate. That is, although the bent angles are caused to have a difference, it is also possible that this shape is formed by radii caused to have a difference between radius distances as a whole. In the ruler main body 1 of an embodiment shown by FIG. 35, the slip stop 7 is possessed in a back face of a flat portion, and an end edge in a side becoming a wide width is bent upward, so that a butt face 1*b* with a desk D is made easy to slip with a radius being made. In a portion including the flat part, although such cuts 21*a*, 21*b* as mentioned above are formed, the cut 21*a* in a side having the butt face 1*b* made the radius is constituted wider than the 21*b* to thereby decrease a resistance against a stronger pressing, thereby supplementing a slide of the butt face 1*b*. One side becomes a form in which the resistance becomes large and which persists against the pressing force because the bent angle is small and a width of the cut 21*b* is narrow. Incidentally, the cuts 21*a*, 21*b* can be replaced also with the punching holes 23 or the like.

As to the above-mentioned constitution, more advantages are contrived by making a constitution in which a wall thickness in the side having the butt face 1*b* is gradually thinned toward its end edge and, as shown in FIG. 36A and FIG. 36B, it is also possible to form the side having the butt face lb by a light material, form the other side by a heavy material 25, and connect them, and it is also possible that this connection is made a constitution in which the end edge in the other side is nipped as shown in FIG. 36B. Additionally, it is also possible that the butt face 1*b* is intermittently formed in a predetermined pitch while being made like pawl pieces, not continues one, and such a matter is also possible that a roller 26 is attached as shown in FIG. 37 instead of the butt face 1*b*.

Figure 38A:
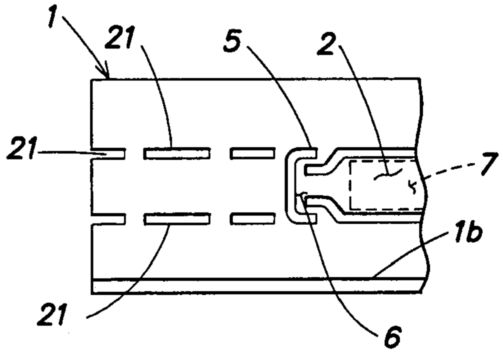
FIGS. 38A and FIG. 38B are views showing respectively other example.
Figure 38B:
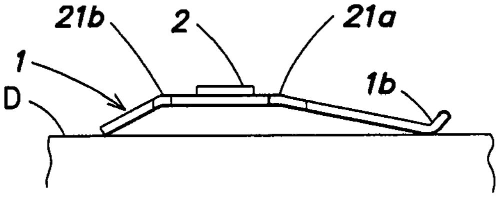

In the ruler main body 1 shown in FIG. 38A and FIG. 38B, one side is made a wide width as mentioned above, the arch part 2 is formed in the flat part by the cuts 3, 3, the strain relief piece 6 is formed by the cut 5, and the slip stop is possessed in the back face of the arch part 2. In this embodiment, although a position of the arch part 2 is biased to one edge side, its flat part itself is caused to have the spring property by, as shown in FIG. 33A to FIG. 33E, intermittently putting the cuts 21, 21—on extended lines of the cuts 3, 3. Incidentally, the cuts 21, 21 in this case are made long near the end part and short in a center side, and it is also possible to cause their width to have a difference while being made 21*a*, 21*b* as mentioned before.

Figure 39A:
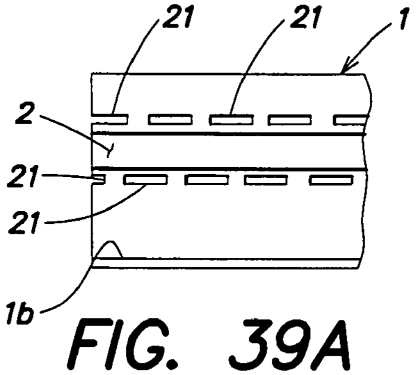
FIGS. 39A and FIG. 39B are views showing respectively other example.
Figure 39B:
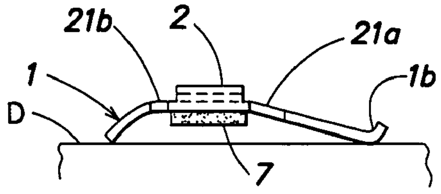

The ruler main body 1 shown as FIG. 39A and FIG. 39B is one formed by folding back the arch part 2 in the constitution shown in FIG. 38A and FIG. 38B. In this case, although the arch part 2 is overlapped on the flat part, the cuts 21, 21—in its both sides are not symmetrical but are ones formed with their positions being mutually deviated like a zigzag.

Figure 40A:
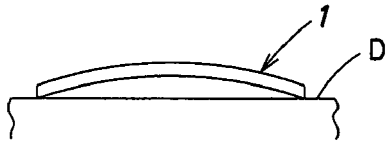
FIGS. 40A to FIG. 40C are views showing respectively a type in which an edge undergoes a force.
Figure 40B:
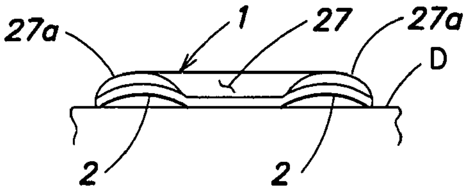
Figure 40C:
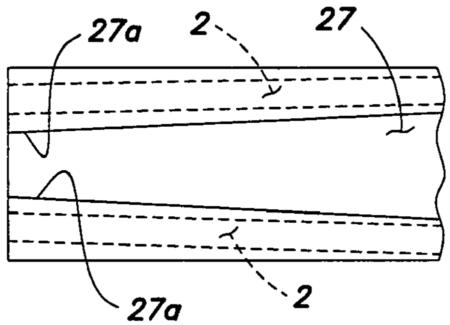

Further, in FIG. 40A to FIG. 40C, there is shown a type in which the ruler main body 1 is formed by a raw material having a strength, and the force is applied to both edges and they persist without the ruler main body 1 itself descending.

The ruler main body 1 shown as FIG. 40A is one in which an arch in the longitudinal direction is made continuous by a material having the strength, and becomes an approximately half pipe shape. The ruler main body 1 of an embodiment shown as FIG. 40B and FIG. 40C is one in which, the arch part 27 extending in the longitudinal direction is overlapped on a base plate having such half-pipe-like arch parts 2, 2 in both side edges, as mentioned above, and there is formed such that arches 27*a*, 27*a* overlapping on the half-pipe-like arch parts 2, 2 are monolithically formed in both sides of the arch part 27, and the arches 27*a*, 27*a* are formed so as to become gradually a wide width toward a center.

Figure 41A:
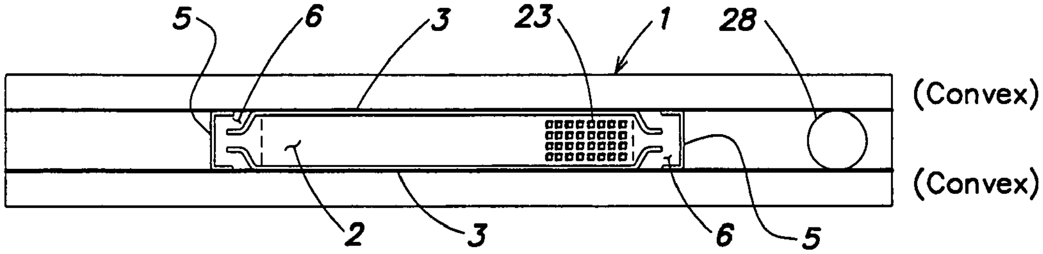
FIGS. 41A and FIG. 41B are views showing respectively other example having the arch part.
Figure 41B:
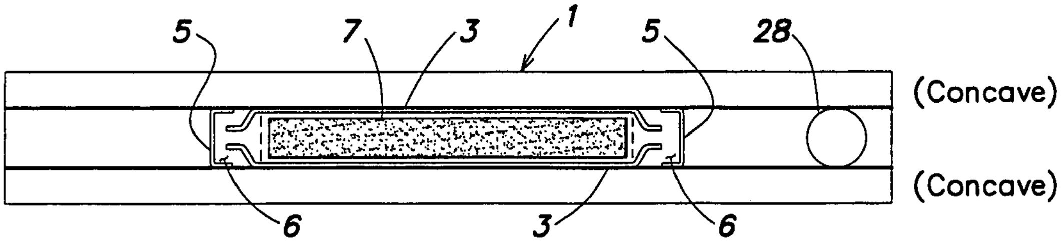
Figure 42A:
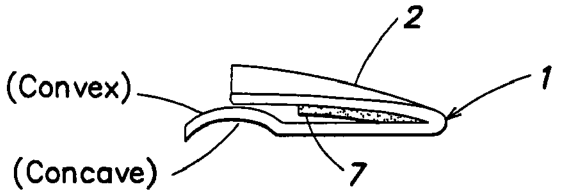
FIGS. 42A to FIG. 42 Dare views showing respectively other example made a folded-back structure.
Figure 42B:
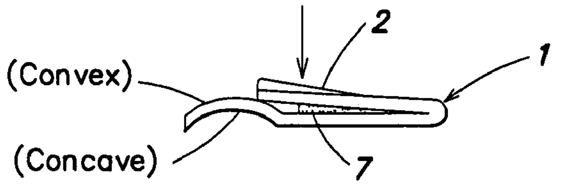
Figure 42C:
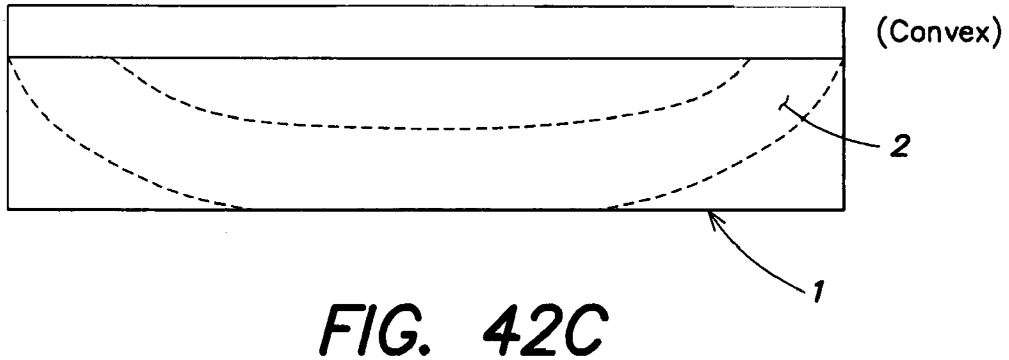
Figure 42D:
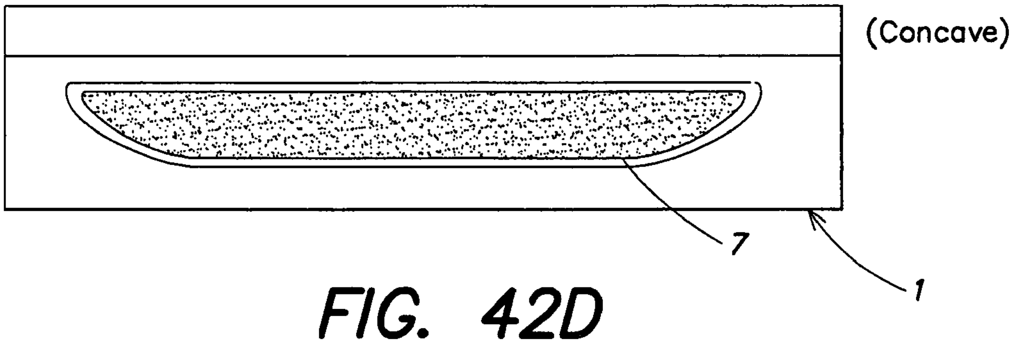

As to the ruler main body 1 shown as FIG. 41A and FIG. 41B, FIG. 41A becomes a plan view, and FIG. 41B a bottom view. In this ruler main body 1, both side parts along the longitudinal direction become convex faces whose sections are made approximately mountain shapes, and reversely its back faces are made concave faces. It is one in which the arch part 2 formed by the cuts 3, 3 is formed in an approximate center of a site included between the convex faces, and the strain relief pieces 6, 6 are formed by the cuts 5, and the slip stop 7 is possessed in the back face of the arch part 2. Further, in this case, it is also possible to provide the punching holes 23 such that an elasticity is brought about by the arch part 2. Incidentally, 28 in the drawings denotes a hook hole for being hooked and hung to a wall or the like. In this ruler main body 1, it follows that one convex face and one side edge of the arch part 2 are pressed by the fingertips. Thereupon, the lower face of the arch part 2 and one convex face closely contact with an object face at the same time, and it follows that an upward relief occurs in one side edge not pressed together with the arch part 2. This form is possible even if the arch part 2 is made a folded-back constitution.

In the ruler main body 1 shown as FIG. 42A to FIG. 42D, one edge of the raw material plate along the longitudinal direction is made the convex face whose section is made the approximately mountain shape, and its back face is made the concave face. The raw material plate is folded back in a short hand direction such that an end edge reaches to an apex face of this convex face, the arch part 2 made like a curve is monolithically formed in that folded-back part, and the slip stop 7 is possessed in the back face of the arch part 2. If the arch part 2 of this ruler main body 1 is pressed, an outside edge of the convex face (concave face) persists, and it follows that a bottom face of the ruler main body 1 becomes one closely contacting with the object face.

Figure 43:
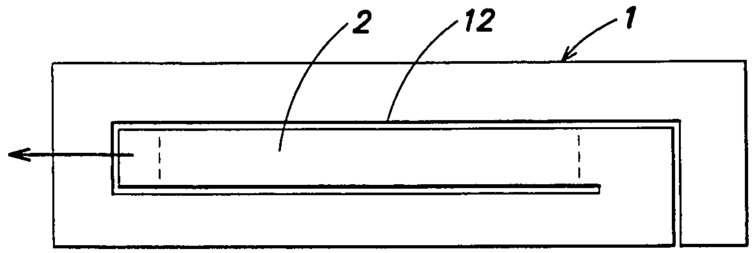
FIG. 43 is a view showing a type in which the cut is continuously changed in its direction.
Figure 44A:
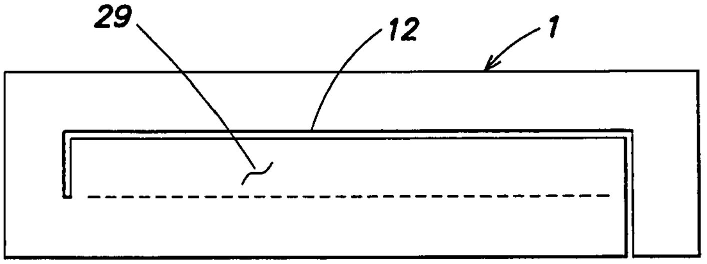
FIGS. 44A and FIG. 44B are views showing respectively other example.
Figure 44B:
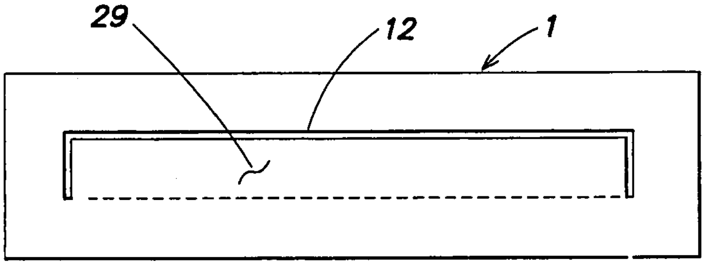

Further, in FIG. 43 to FIG. 44B, there are shown the ruler main bodies 1 of types in which various linear slits 12 are put in the raw material plate while being combined, thereby forming the arch part or a spring property retention part. In the ruler main body 1 shown in FIG. 43, the parallel slits 12 are put in an approximately center part of the flat raw material plate along the longitudinal direction, an end part of the slit 12 is made contiguous in a perpendicular direction, and one of the slits 12 is opened in an end edge of the raw material plate in the longitudinal direction by being extended and bent at right angle. And, a portion included between chain lines in a portion included between the slits 12 is made the arch part 2 whose center site is bulged. If this arch part 2 is pressed, a relief stress occurs from a form of the slit 12 in an arrow direction in the drawing, so that the bottom face of the ruler main body 1 closely contacts with the object face. The slip stop is possessed in the back face of the arch part 2. In this example, by putting length graduations, which are different in unit, in each side edge formed by the slits 12, and being bent and held while utilizing a wrist or fingertips, it becomes possible also to be utilized as the scale in each unit.

The ruler main body 1 shown as FIG. 44A and FIG. 44B is one in which the slit 12 is made the approximately U-shaped form by bending end parts of the slit 12 of the raw material plate of right angle along the longitudinal direction, and one in which a portion surrounded by the slit 12 is made a spring piece 29 whose longitudinal direction lifts. In an example shown in FIG. 44A, the slit 12 is additionally extended, and opened in the end edge of the raw material plate along the longitudinal direction. Further, in a case shown by FIG. 44B, that opening does not exist, and a raw material plate end edge in a direction reverse to a lift edge of the spring piece 29 rises by the pressing of the spring piece 29, thereby transmitting a force to the other end edge (edge) by that rise. In order to make this more effective, it is possible to wholly transmit the force demanded for the rise to the other end edge by forming a convex part, which prevents that rise, in an outside near the perpendicularly bent end part of the slit 12.

Figure 45A:
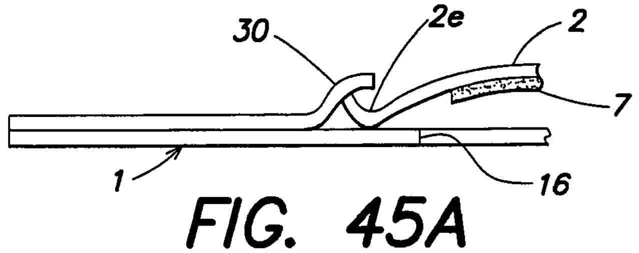
FIGS. 45A and FIG. 45B are views showing respectively a type generating a force pressing downward the ruler by a principle of lever in regard to the arch part.
Figure 45B:
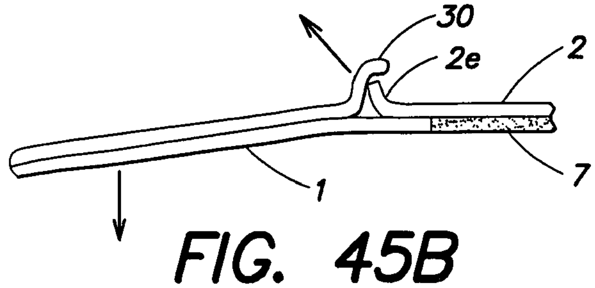
Figure 46:
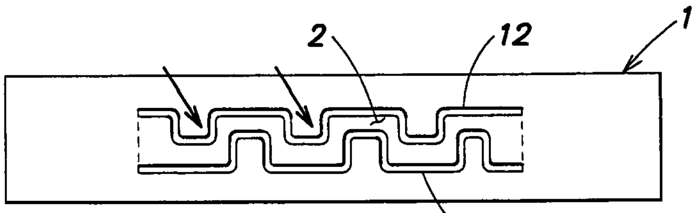
FIG. 46 is a view showing a type having other strain relief structure.
Figure 47:
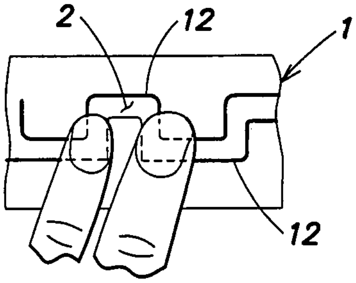
FIG. 47 is a view showing a use example.
Figure 48A:
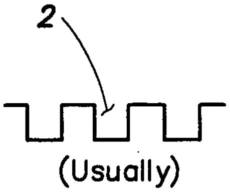
FIGS. 48A and 48B are views showing respectively a strain relief state.
Figure 48B:
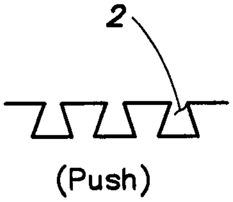

The ruler main body 1 shown in FIG. 45A and FIG. 45B shows a type in which a principle of lever is applied by the pressing force of the arch part 2, and the bottom face of the ruler main body 1 is closely contacted with the object face. In the ruler main body 1 shown in FIG. 45A and FIG. 45B, one side is folded back to thereby form the arch part 2, in its back face there is possessed the slip stop 7, and there is provided the window hole 16 through which the slip stop 7 goes in and out. Further, the tip of the arch part 2 is bent upward to thereby make an engaging part 2*e*, and this engaging part 2*e* is folded back in its other side and welded, thereby engaging with an inner face of a reception part 30 whose tip is made like an arc. If the arch part 2 of this ruler main body 1 is pressed, it follows that the slip stop 7 goes into the window hole 16, at this time the engaging part 2*e* exerts a force pushing up the reception part 30 slantingly upward and, by that force, a force pushed downward generates in an end part of the ruler main body 1.

In FIG. 46 to FIG. 48B, it is a type in which, in the ruler main body 1 comprising one raw material plate, a backlash between the arch part 2 and a ruler face is prevented by a function of the strain relief. In the ruler main body 1 shown here, in the raw material plate there are put one pair of slits 12, 12 having a digital waveform, and a portion between the slits 12, 12 is made the arch part 2 possessing in its back face the slip stop. That is, this arch part 2 is made a form having plural curves when seen in a plane. In this ruler main body 1, if the arch part 2 is pressed, the relief generates in arrow directions in FIG. 46, so that the arch part 2 contracts (refer to FIG. 48A and FIG. 48B) . Here, if the ruler face is pressed by the fingertips at the same time as the arch part 2, it is possible to prevent the arch part 2 from backlashing between the slits 12, 12 (refer to FIG. 47).

Figure 49:
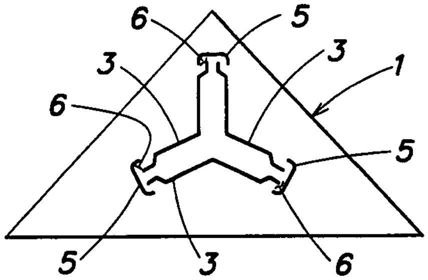
FIG. 49 is a view showing a triangular ruler having the arch part, as other example.
Figure 50:
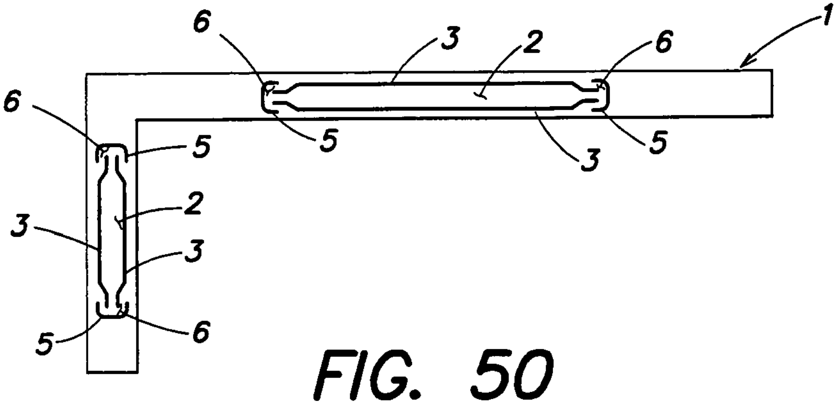
FIG. 50 is a view showing a carpenter's iron square type.

The example mentioned above is one capable of being applied not only to a linear ruler but also to various rulers as mentioned above and, as its example, in FIG. 49 there is shown an example applied to the isosceles triangle ruler main body 1. The cuts 3, 3 in this case are made like a parallel radiation to thereby form a three-directional arch part 2 and, in its respective end parts, the strain relief pieces 6, 6 are formed by the cuts 5, 5. Further, the ruler main body 1 shown as FIG. 50 is one of a carpenter's iron square type made a right angle. In this case, in each of a long square part and a short square part, such arch parts 2, 2 as shown in FIG. 1 to FIG. 5 are formed by the cuts 3, 3, and the strain relief pieces 6, 6 are formed by the cuts 5, 5.

Figure 51A:
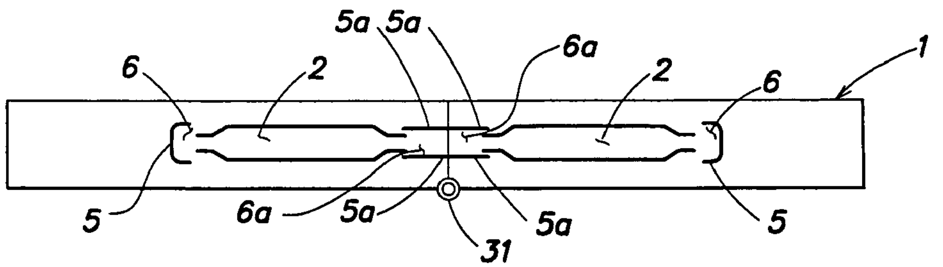
FIGS. 51A to FIG. 51F are views showing respectively a type made foldable or like an L-letter in section.
Figure 51B:
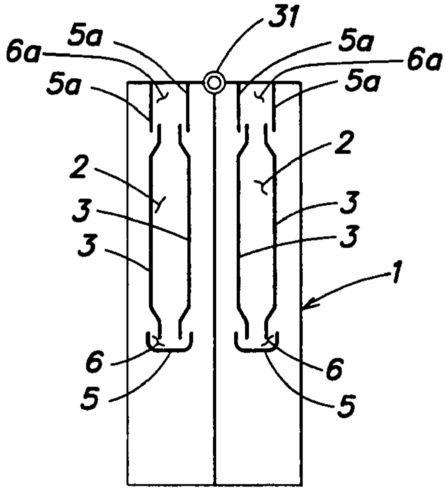
Figure 51C:
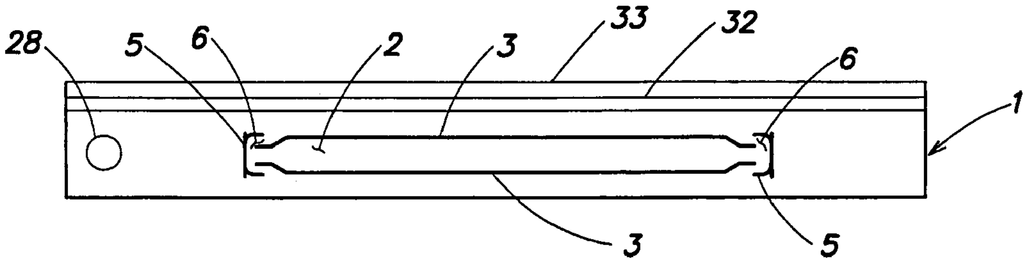
Figure 51D:
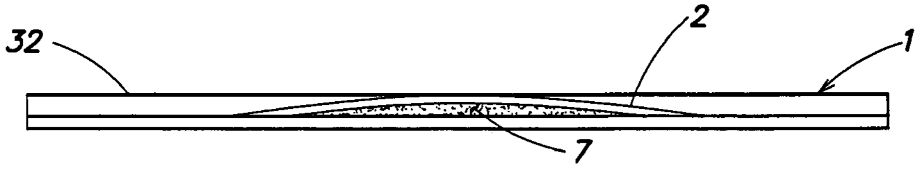
Figure 51E:
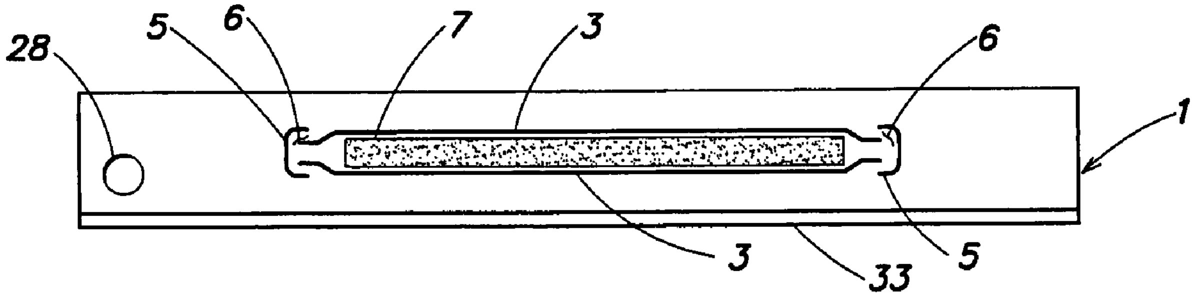
Figure 51F:
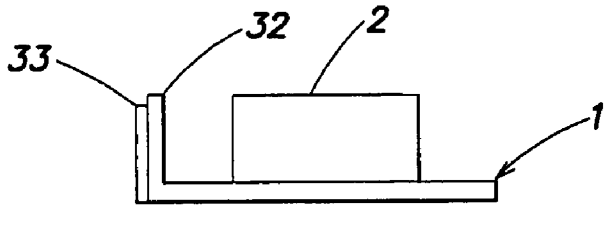
Figures 52A, 52B, 52C, 52D:
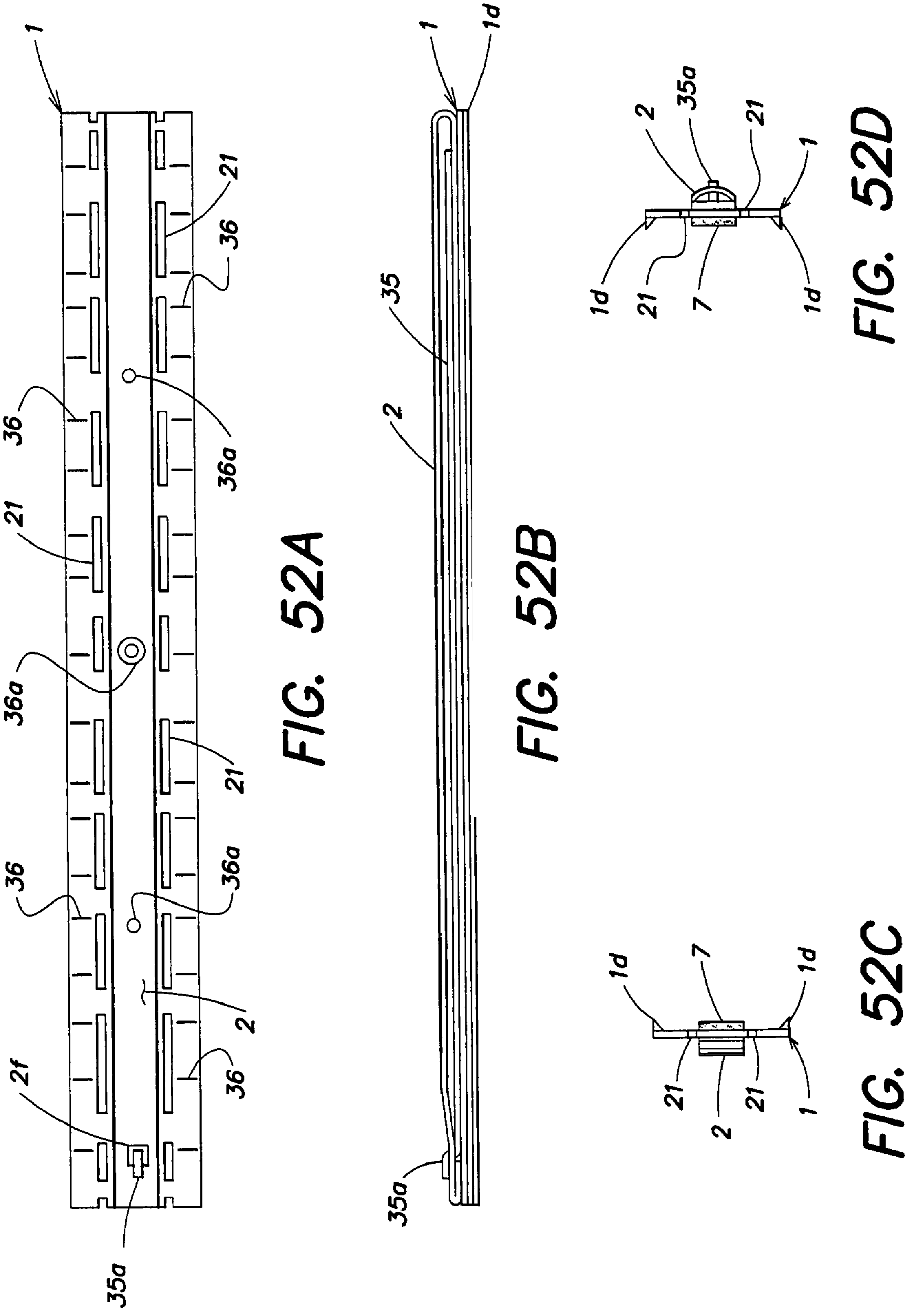
FIGS. 52A to FIG. 52D are views showing respectively a three-piece overlapped type.

In FIG. 51A to FIG. 51F, a foldable type and an L-shaped type in section for cutting are shown respectively as FIG. 51A and FIG. 51B, and FIG. 51C to FIG. 51F. The foldable ruler main body 1 of FIG. 51A and FIG. 51B is divided in its center part, and possesses in one corner a pivot support part 31. In this ruler main body 1, even if one of the divided parts is pressed, the other rotates usually. However, in the present embodiment, the arch parts 2, 2 are respectively formed near its divided part by the cuts 3, 3, thereby forming the strain relief pieces 6, 6*a* by the cuts 5, 5*a*. Further, the cuts 5*a*, 5*a* becomes ones mutually made contiguous under a linearly extended state. In this structure, it is possible to simultaneously press the two arch parts 2, 2 by the fingertips, so that it is possible to prevent the rotation of one mentioned above.

Further, in FIG. 51C to FIG. 51F, there is shown the ruler main body 1 used mainly for cutting. This ruler main body 1 is one in which there are formed the arch part 2 formed by the cuts 3, 3 and the strain relief pieces 6, 6 formed by the cuts 5, 5. In one edge of the ruler main body 1 along the longitudinal direction, a standing wall 32 formed in an L-type is monolithically formed, and a metal-made cutter guide 33 is possessed in an outer surface of the standing wall 32 by the double-sided adhesive tape, screws or the like. By making this L-type, not only it is possible to prevent a flex especially in a case where it is long and thin, but also there can be efficiently used as a risk prevention at a cutting time and a handle at a movement time. Incidentally, 28 in the drawing denotes a hooking and hanging through-hole.

The ruler main body 1 shown in FIG. 52A to FIG. 52D is made a constitution in which the arch part 2 formed by a separate member while being folded back is overlapped to a center site on the raw material plate becoming a base along the longitudinal direction, and a flat plate 35 of a separate member is additionally provided between its folded-back parts. Edges 1*d*, 1*d* are monolithically provided below both side edges of the raw material plate of the ruler main body 1, the cuts 21, 21—are intermittently provided along both side edges of the arch part 2 to thereby cause also the ruler main body 1 to have the spring property, and the slip stop 7 is possessed in the back face of a portion included between the cuts 21, 21—.

In the both side edges of this ruler main body 1, graduations 36, 36—making also a length measurement as the scale possible are provided in a predetermine pitch, and marks 36*a*, 36*a* becoming a standard of a constant length are applied in a surface of the arch part 2. Further, the arch part 2 is made a constitution in which a longitudinal direction radius is gradually added from the folded-back part to its tip, and there is made like an approximately half pipe in a tip vicinity. A through-hole 2*f* is formed in this tip and, since a hook 35*a* provided in the flat plate 35 is hooked and fixed to the through-hole 2*f*, there becomes one capable of performing a work under a more stable state. Further, it is also possible to apply the above-mentioned graduation 36 to the arch part 2, and a unit in that case is possible not only with a metric system but also with other system such as yard-pound system or shaku-kan system.

Figure 53A:
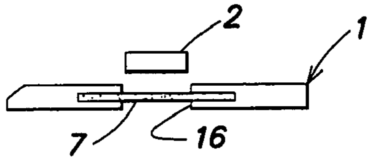
FIGS. 53A to FIG. 53J are views showing respectively a type having a slip stop in a wall thickness intermediate of the ruler.
Figure 53B:
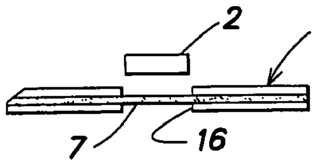
Figure 53C:
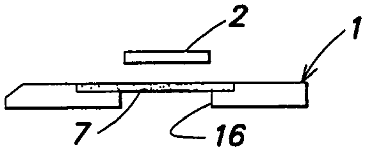
Figure 53D:
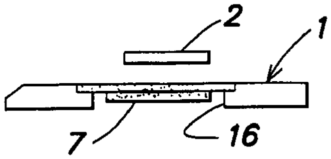
Figure 53E:
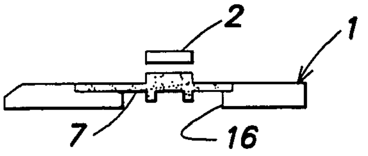
Figure 53F:
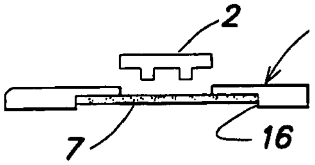
Figure 53G:
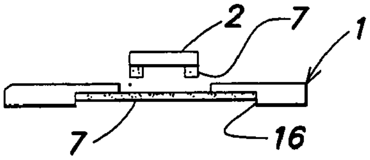
Figure 53H:
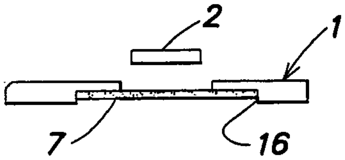
Figure 53I:
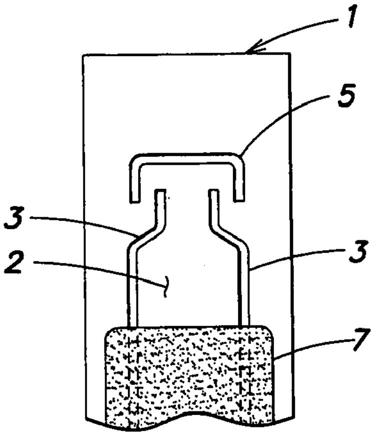
Figure 53J:
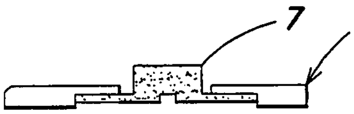
Figure 54A:
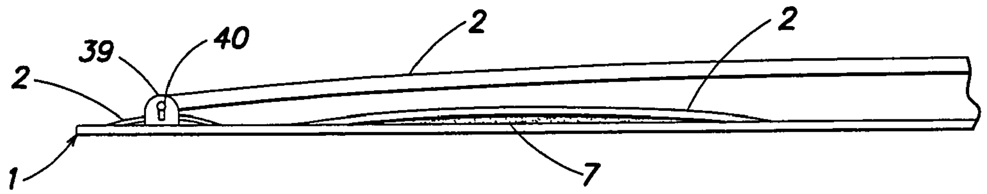
FIGS. 54A to FIG. 54D are views showing respectively a type in which arch spring members are overlapped and their end parts ascend/descend.
Figure 54B:
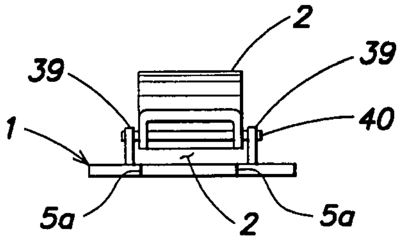
Figure 54C:
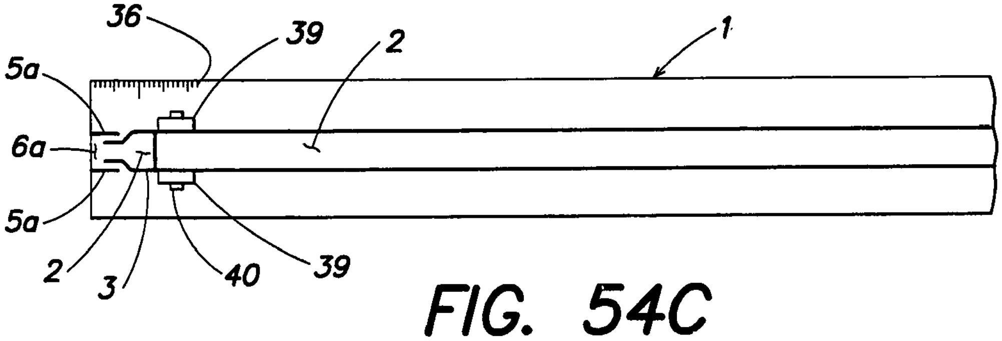
Figure 54D:
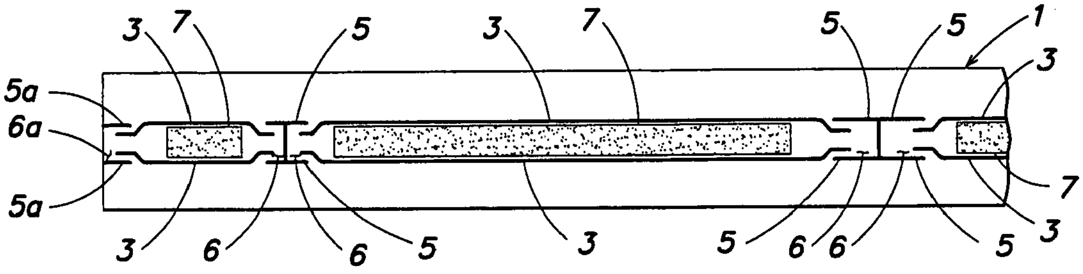

Further, in ones shown as FIG. 53A to FIG. 53J, the slip stop 7 is respectively retained under a state in which it is raised than the lower face of the ruler main body 1. A case of FIG. 53A is a form in which the slip stop 7 is retained in an inner wall face of the window hole 16 of the ruler main body 1 such that the slip stop 7 extends over a whole face of the window hole 16. A case of FIG. 53B is made one in which the ruler main body 1 is overlapped in two pieces, and is one in which between them there is nipped the slip stop 7. When the arch part 2 is pressed down, in the ruler main body 1 there are obtained a strong fixation force and a prevention of the backlash. Additionally, in FIG. 53C to FIG. 53J, there are shown some examples of a structure for installing the slip stop 7 to the window hole 16. In FIG. 53C, there is made a structure in which the sheet-like slip stop 7 of a flexible raw material is provided in an upper face of the window hole 16, and it is pressed down by the arch part 2. In this case, even if the arch part 2 is not used, it is also possible to simply, directly press and descend this slip stop 7 by a finger. Further, as a type pressed by the finger, in FIG. 53J, although there is shown one in which a convex part is monolithically formed in a surface of the slip stop 7, this convex part may be a cuboid, or may be made a curved face whose surface forms an arch. Further, one shown in FIG. 53D is one in which the slip stop 7 is overlapped in two pieces and, in FIG. 53E, there is shown an example in which the convex parts are formed up and down. And, FIG. 53F shows one in which a convex part for pressing is particularly formed in a lower face of the arch part 2, and FIG. 53G one in which the separate slip stop 7 is provided instead of the convex part for pressing. In FIG. 53E, FIG. 53F, FIG. 53G and FIG. 53J, since there is pressed in two places of the slip stop sheet 7, there can be fixed under a more stable state. Additionally, in FIG. 53H and FIG. 53I, there are shown ones in which the slip stop 7 is arranged in a lower face side of the window hole 16 of the ruler main body 1. In a case where, by this type, there is made a two-piece type ruler, there can be implemented if an interstice is formed or not formed between the slip stop sheet 7 and the window hole 16.

Further, the ruler main body 1 shown as FIG. 54A to FIG. 54D is an example in which the related arts described in the Patent Documents 1 and 2 are improved, and made one in which the arch parts 2, 2 formed by the cuts 3, 3 are continuously formed in the raw material plate by plural pieces till a most end part, in each of them there are formed the strain relief pieces 6, 6*a*, and the slip stops 7, 7—are possessed in the back face. In this example, there becomes a form in which brackets 39, 39 having long holes in a vertical direction are possessed on the ruler main body 1 made such a constitution, especially with a center portion of the arch part 2 becoming a most end being included between them, and there a shaft 40 inserted through an end part of a long separate arch member 2 extending over the ruler main body 1 is inserted through the long holes of the brackets 39, 39. In this constitution, if the arch member 2 is pressed, it presses the arch part 2, 2—formed in the ruler main body 1, the slip stops 7, 7—are closely contacted with the object face, and the strain relief pieces 6, 6*a* act as well. In addition, the arch part 2 becoming a most end portion is strongly pressed by the shaft 40, and becomes one in which a stronger close contact is possible as a whole. Incidentally, in the drawing, although the arch part 2 in the most end portion is formed in a lateral direction, it is of course that it can be formed in a longitudinal direction.

Figure 55A:
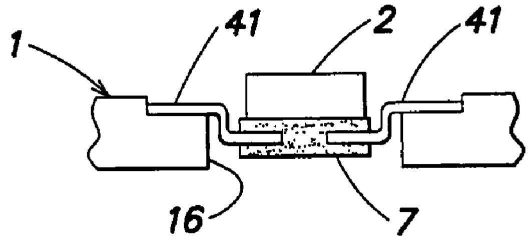
FIGS. 55A to FIG. 55C are views showing respectively an example in which a spring member is interposed.
Figure 55B:
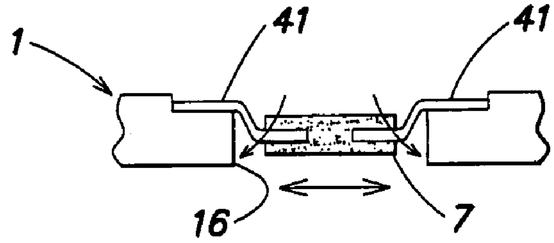
Figure 55C:
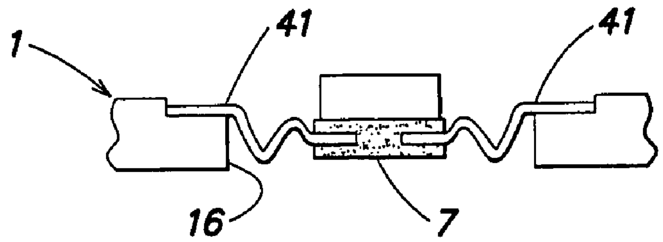
Figure 56A:
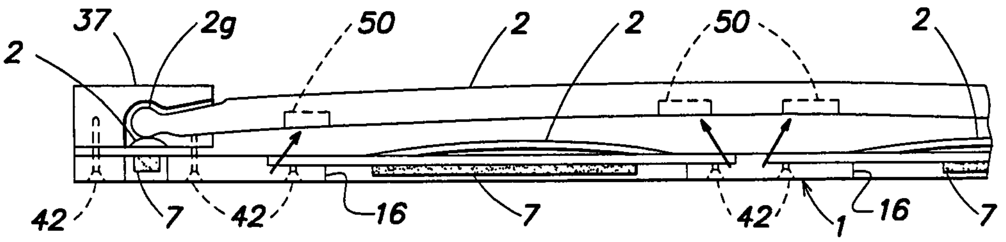
FIGS. 56A to FIG. 56F are views showing respectively an example made a constitution having a box part in a back face of an arch spring.
Figure 56B:
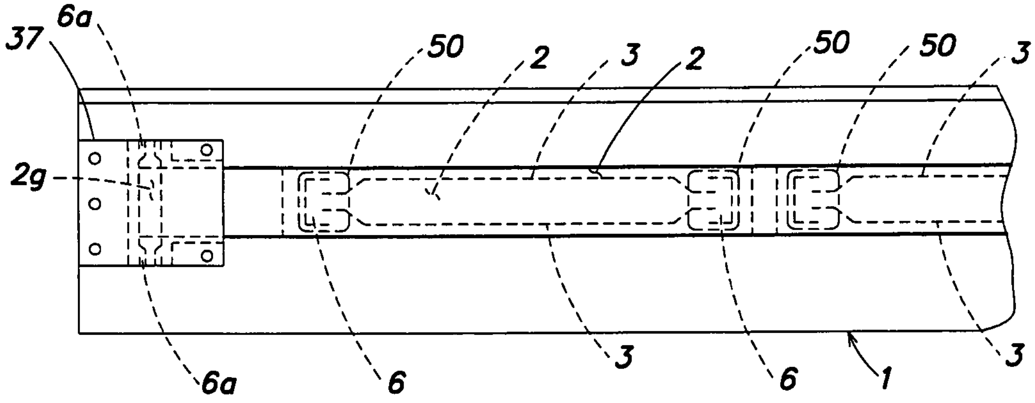
Figure 56C:
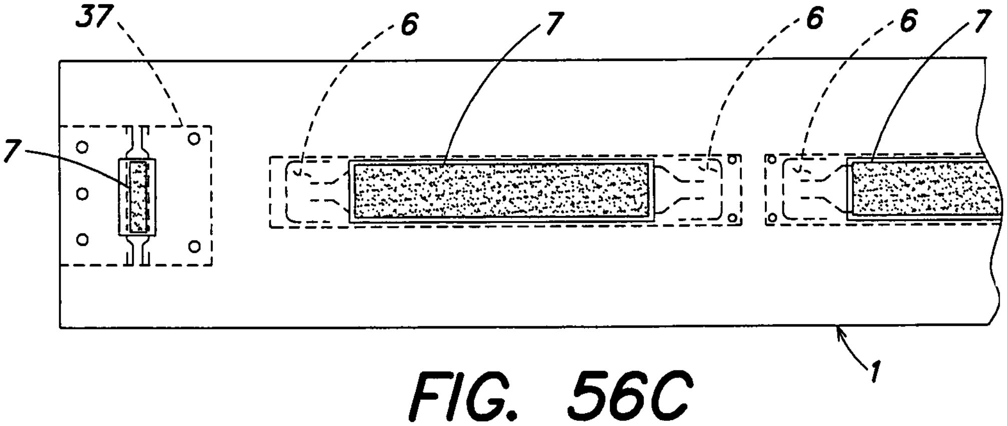
Figure 56D:
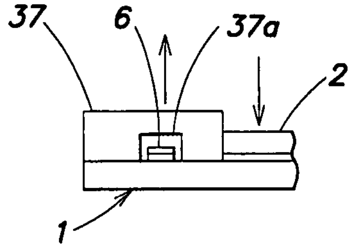
Figure 56E:
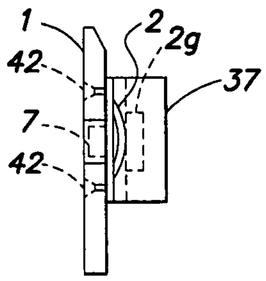
Figure 56F:
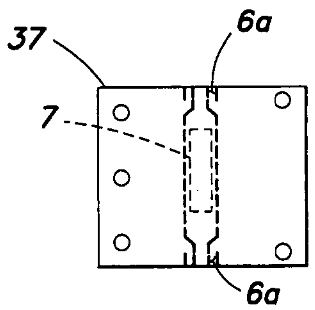
Figure 57A:
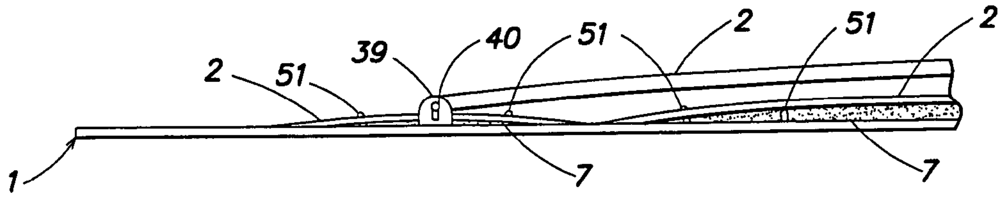
FIGS. 57A to FIG. 57F are views showing respectively an example possessing the strain relief in the arch spring member.
Figure 57B:
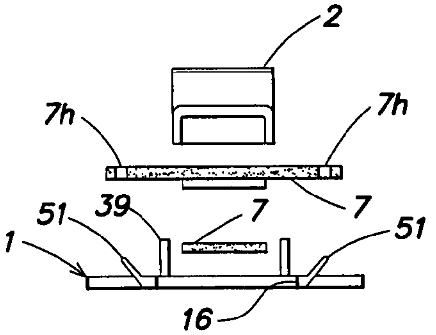
Figure 57C:
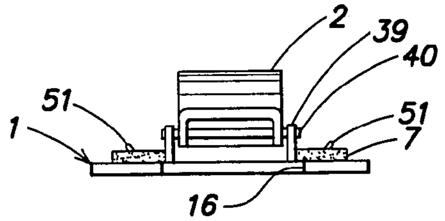
Figure 57D:
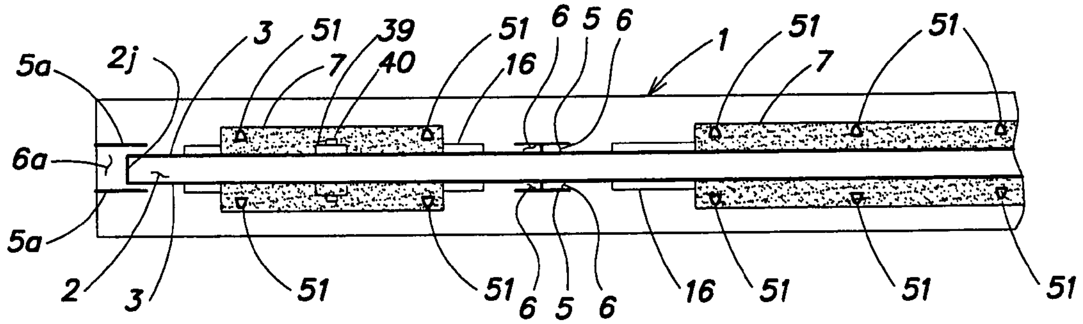
Figure 57E:
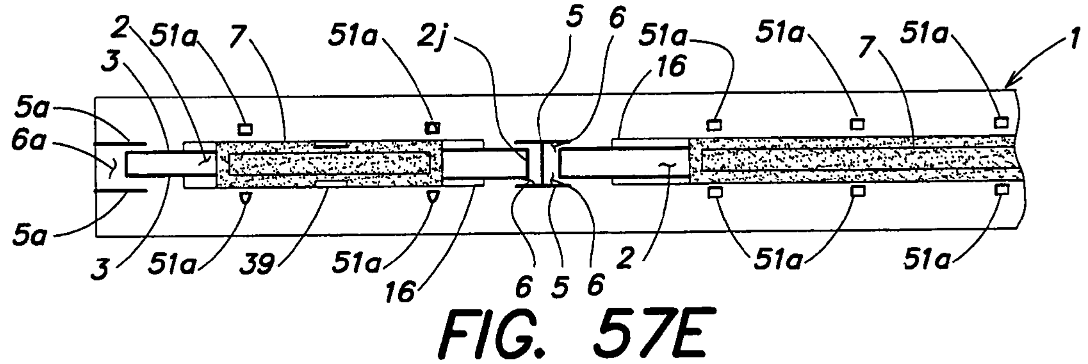
Figure 57F:
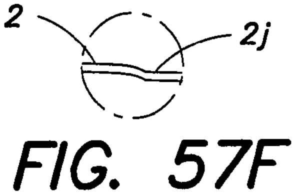
Figure 58A:
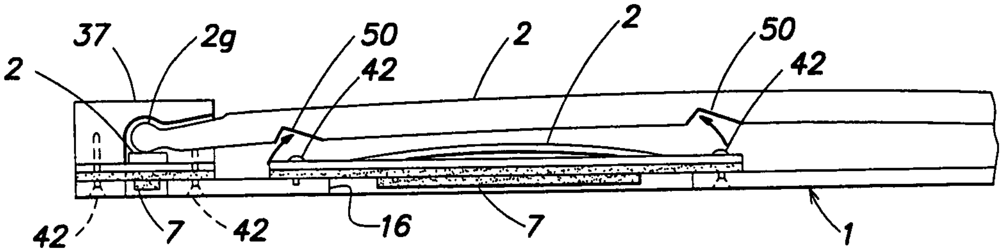
FIGS. 58A to FIG. 58E are views showing respectively other example.
Figure 58B:
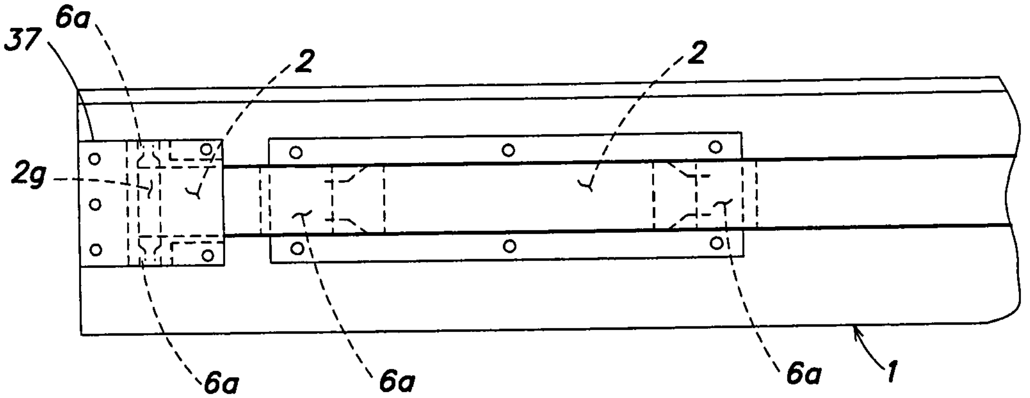
Figure 58C:
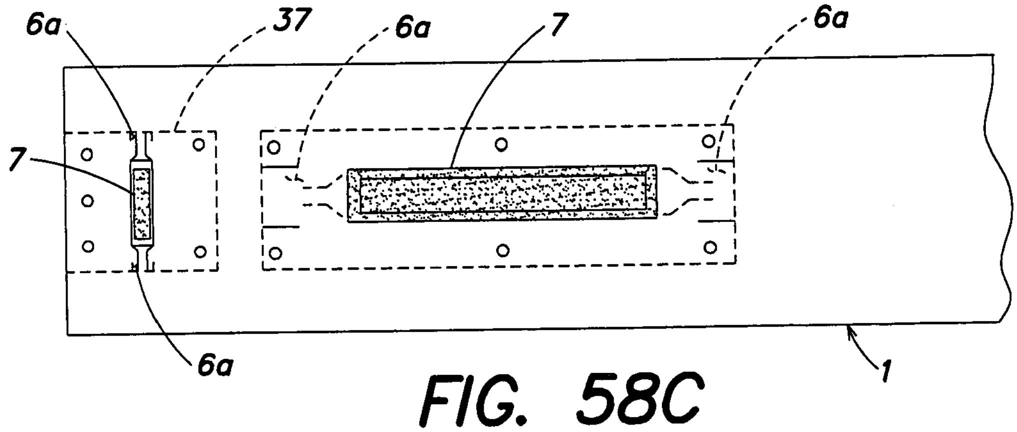
Figure 58D:
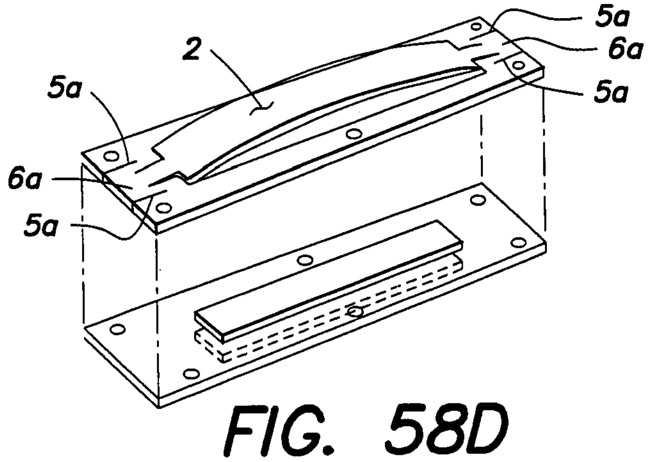
Figure 58E:
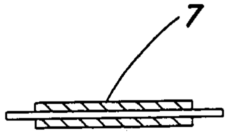

Ones shown as FIG. 55A to FIG. 55C are ones of a constitution in which an ascent/descent of the slip stop 7 is performed by a spring material, especially by utilizing an elasticity of a leaf spring. One shown as FIG. 55A shows an initial state of a first example, FIG. 55B shows a state at pressing time, and it is made one in which leaf springs 41, 41 bent like a crank are fixed to a step part in an opening upper edge of the window hole 16 of the ruler main body 1, and the leaf springs 41, 41 are caused to retain the slip stop 7. If this slip stop 7 is pressed by the arch part 2, the elasticity of the leaf springs 41, 41 acts downward and outward to thereby descend the slip stop 7, and it follows that the slip stop 7 closely contacts with the object face under a state extended in the lateral direction.

Further, one shown as FIG. 55C is one in which at least one S-shaped bent part is possessed in the leaf springs 41, 41 and, if the slip stop 7 is pressed by the arch part 2, the leaf springs 41, 41 extend in the bent part, so that it follows that the slip stop 7 is descended. It is also possible to replace the leaf springs 41, 41 in this case with coil springs. In addition, it is also possible that a tip of at least one leaf spring 41 can slide in a groove formed in a side face of the slip stop 7. In such a constitution, if the slip stop 7 is pressed by the arch part 2, the tip of one leaf spring 41 slides in the groove and under this state the slip stop 7 is nipped between the arch part 2 and the object face, and it follows that the tip of the leaf spring 41 is positioned and fixed to thereby prevent the backlash.

A case shown as FIG. 56A to FIG. 56F is an improved type of the type in which the arch member 2 as the separate member is provided while being overlapped to the ruler main body 1 in which the cuts 3, 3 are put in the raw material plate and constituting the arch part 2. In the ruler main body 1, the arch parts 2, 2—formed by such cuts 3, 3 as explained in FIG. 1 to FIG. 5 are intermittently, continuously provided, the slip stop 7 is possessed in the back faces of the arch parts 2, 2, this slip stop 7 is made a backlash preventing type reaching also to the opening upper edge of the window hole 16, and the strain relief pieces 6, 6 are formed in both edges of each of the arch parts 2, 2—. Additionally, in both end portions of the ruler main body 1, there is formed the separate arch part 2 possessing the slip stop 7 in the back face in the longitudinal direction with a constitution similar to the above-mentioned arch part 2.

In an upper face of this ruler main body 1, there is possessed a separate arch member 2 in whose end part there is formed an R-like operation part 2*g*. The R-like operation part 2*g* of this arch member 2 is butted against an apex face, which is made the longitudinal direction, of the arch part 2 in the most end part of the ruler main body 1, and this most end part is enclosed by a pressing metal fitment 37 while being fixed from below by small screws 42, 42. Further, in this pressing metal fitment 37, there is formed a hole 37*a* allowing the lift of the strain relief piece 6 of the arch part 2 in the longitudinal direction. Further, in the back face of the above-mentioned separate arch member 2, there are formed box parts 50, 50 receiving the lifts of the strain relief pieces 6, 6—of each of the arch parts 2, 2 formed in the lateral direction.

The ruler main body 1 shown as FIG. 57A to FIG. 57F is a modified example of one in which the arch part 2, 2—formed in the ruler main body 1 by the cuts 3, 3 are continuously formed in the lateral direction with their sizes being changed. Similarly to the above-mentioned case of FIG. 54A to FIG. 54D, it has the separate arch member 2 in the upper face of the ruler main body 1, and the end part of that arch member 2 is positioned to the apex face of the arch part 2 in the most end in the ruler main body 1 by using the bracket 39 and the shaft 40. Here, there is made a constitution in which the window hole 16 is formed wider than a width of the arch part 2 and, in an opening upper face of the window hole 16, there is provided the slip stop 7 which is like a sheet and has in its back face a convex part. Further, as shown as FIG. 57F while being enlarged, a standing position line 2*j* of the arch part 2 is made a constitution in which it is not a continuation of sliding face but is slightly stepped, and thereby there is contrived so as to exert a click feeling.

Further, in this embodiment, lock hooks 51, 51—are formed by cutting up side parts of the window hole 16, and also an exchange of the slip stop 7 is made possible by hooking and fixing the lock hooks 51, 51—to holes 7*h*, 7*h* formed in a sheet part of the slip stop 7. Incidentally, there is made such that, like the bottom view shown in FIG. 57E, a convex part below the slip stop 7 is included between the brackets 39, 39. Further, 51*a* in the drawing is a cut-up hole of the lock hook 51. Incidentally, as to an attachment structure of the slip stop 7 in this embodiment, various ones already mentioned can be all applied and implemented.

Additionally, one shown as FIG. 58A to FIG. 58E is an example in which the window hole 16 is previously provided in the raw material plate, and a separate raw material plate, in which there is formed the arch part 2, and the slip stop 7 are overlapped and fixed onto the opening edge of the window hole 16. In this embodiment, the slip stop 7 to be used is made one in which hard slip stops are symmetrically overlapped as convex parts above and below an extensible sheet material. To an upper face of this slip stop 7, there is overlapped a plate of a separate raw material, whose size is made approximately the same as the slip stop 7, at the ruler main body 1 of the constitution explained in FIG. 1 to FIG. 5, i.e., one in which the arch part 2 is formed by the cuts 3, 3 and, in the end part of that arch part 2, there are formed the strain relief pieces 6*a*, 6*a* lifted upward by the cuts 5*a*, 5*a*, and there is fixed to the opening edge upper face in the window hole 16 of the raw material plate by means of the small screws 42, 42—.

The separate arch member 2 is provided on the raw material plate of the above-mentioned constitution and, as mentioned before, there is made the constitution in which the R-like operation part 2*g* in the end part of that arch member 2 is butted against the apex face of the arch part 2, in the longitudinal direction, possessing in its back face the slip stop 7 and is provided in the most end of the raw material plate, and then enclosed by the pressing metal fitment 37. Further, in the back face of the separate arch member 2, the box part 50 receiving the lift of the strain relief piece 6*a* of the arch part 2 arranged on the raw material plate is formed as a notch state. Here, if the separate arch member 2 is pressed, it follows that the arch part 2 arranged on the raw material plate is pressed down, the arch part 2 on that raw material plate presses the upper convex part of the slip stop 7, and the lower convex part is butted against the object face with the sheet part being extended. Further, it follows that the R-like operation part 2*g* in the end part of the separate arch member 2 presses the arch part 2 in the longitudinal direction, and the slip stop 7 in its back face is closely contacted with the object face.

The ruler concerned with the present embodiment is constituted as mentioned above. The fact that this can be applied to the rulers of various forms is as mentioned before. Further, as the slip stop 7, if the rubber is used, there is also a fear that a color of that rubber sometimes adheres to the paper face or the like, so that it is desirable to use a raw material in which the rubber and the plastic are combined. Further, in a case where the object is a wood material or the like, such a matter is also possible as to use, as the slip stop 7, many needles and pins, or spike-like ones to thereby thrust them.

A ruler concerned with the present invention may be one in which one pair of parallel slits are put in one raw material plate, a through-hole having various shapes is formed continuously with the slits, an arch part, in which a part included between the one pair of parallel slits is bulged upward by a working means such as heating or pressure friction, is formed monolithically with the raw material plate, and a strain is relieved by absorbing, by the through-hole, a reaction force of a pressing force exerted on the arch part, and raising upward an end part of the arch part, or one in which a template is formed by the through-hole, or one in which, instead of the through-hole, an expansion/contraction material such as sponge or rubber sheet is connected to the end of the arch part, and the strain is relieved by the expansion/contraction material.

A ruler concerned with the present invention may also be one in which both ends of a long square raw material plate are folded back, a reception part of an arch part is formed in at least one of the folded-back ends, and there is possessed the arch part in which an engaging part, whose tip is bent upward, is engaged with the reception part.

What is claimed is:

1. A ruler in which one pair of parallel cuts are put in one raw material plate, a supporting point part is formed by narrowing both ends of the parallel cuts or making the both ends like a fork, a bent cut or a linear cut reaching to an end part of the raw material plate is put so as to surround the supporting point part or extend along it, and an arch part, in which a part included between the parallel cuts is bulged upward by a working means such as heating, pressure friction, injection molding or chemical treating, is formed monolithically with the raw material plate.

2. A ruler according to claim 1, wherein a slip stop is applied wholly or partially in a back face of the arch part.

3. A ruler according to claim 2, wherein the slip stop comprises one of a paint wherein a letter or a pattern is expressed by the paint, and a rubber sheet wherein a letter or a pattern is carved thereto and expressed.

4. A ruler according to claim 3, wherein plural raw material plates are rotatably connected in one corner of each of the raw material plates.

5. A ruler according to claim 3, wherein a separate arch spring member is mounted on the raw material plate and, in a back face of the arch spring member, there is formed a box part receiving a strain relief portion formed by cuts.

6. A ruler according to claim 5, wherein an end part of the arch spring member is engaged with a long hole in a vertical direction of a bracket, which is vertically provided in the raw material plate, by a shaft, and the shaft is made so as to correspond to an arch part formed in a most end part.

7. A ruler according to claim 2, wherein plural raw material plates are rotatably connected in one corner of each of the raw material plates.

8. A ruler according to claim 2, wherein a separate arch spring member is mounted on the raw material plate and, in a back face of the arch spring member, there is formed a box part receiving a strain relief portion formed by cuts.

9. A ruler according to claim 8, wherein an end part of the arch spring member is engaged with a long hole in a vertical direction of a bracket, which is vertically provided in the raw material plate, by a shaft, and the shaft is made so as to correspond to an arch part formed in a most end part.

10. A ruler according to claim 1, wherein plural raw material plates are rotatably connected in one corner of each of the raw material plates.

11. A ruler according to claim 1, wherein a separate arch spring member is mounted on the raw material plate and, in a back face of the arch spring member, there is formed a box part receiving a strain relief portion formed by cuts.

12. A ruler according to claim 11, wherein an end part of the arch spring member is engaged with a long hole in a vertical direction of a bracket, which is vertically provided in the raw material plate, by a shaft, and the shaft is made so as to correspond to an arch part formed in a most end part.

13. A ruler in which one pair of parallel slits are put in one raw material plate, a through-hole having various shapes is formed continuously with the slits, an arch part, in which a part included between the one pair of parallel slits is bulged upward by a working means such as heating or pressure friction, is formed monolithically with the raw material plate, and a strain is relieved by absorbing, by the through-hole, a reaction force of a pressing force exerted on the arch part, and raising upward an end part of the arch part.

14. A ruler according to claim 13, wherein a template is formed by the through-hole.

15. A ruler according to claim 13, wherein, instead of the through-hole, an expansion/contraction material such as sponge or rubber sheet is connected to the end of the arch part, and the strain is relieved by the expansion/contraction material.

16. A ruler in which one pair of parallel slits are put in one raw material plate, an arch part, in which a part included between the slits is bulged upward by a working means such as heating or pressure friction, is formed monolithically with the raw material plate, slits are put continuously with the former slits at about 30 degrees-60 degrees in four corners of the arch part, and cuts are put also in four corners of the raw material plate at about 45 degrees.

17. A ruler in which one pair of parallel slits are put in one raw material plate, an arch part, in which a part included between the slits is bulged upward by a working means such as heating or pressure friction, is formed monolithically with the raw material plate, and a mountain-shaped bent protrusion part is formed near at least one end part of the arch part.

18. A ruler in which about half of a length of one elongated rectangular raw material plate is made about half as wide as a wide width portion of the plate while being made near an inside, an arch part is formed by folding back a half width portion of the plate to an upper face direction of the wide width portion, respective free ends of the arch part and the wide width portion are fixed in a vertical direction, and an approximately mountain-shaped bent protrusion part is formed near the fixed part of the arch part.

19. A ruler in which one pair of parallel cuts are put in one raw material plate, cuts for a strain relief are put in end parts of the former cuts, an arch part, in which a part included between the one pair of parallel cuts is bulged upward by a working means such as heating or pressure friction, is formed monolithically with the raw material plate, and additionally a different arch part is monolithically overlapped to and formed in the arch part.

20. A ruler in which an about half of a length of one elongated rectangular raw material plate is made an about half width while being made near an inside, its half width portion is folded back upwardly of a wide width portion to thereby make the folded-back half width portion into an arch part, and a free end of the arch part is made so as to be capable of sliding in a gate part formed in an end part of the wide width part.

21. A ruler in which both ends of an elongated rectangular raw material plate are folded back, a reception part of an arch part is formed in at least one of the folded-back ends, and the arch part includes an engaging part, whose tip is bent upward, engaged with the reception part.

22. A ruler comprising:

a plate;

an arch part which is formed monolithically with the plate, the arch part being formed by providing a pair of parallel cuts in the plate and bulging upward a part of the plate between the parallel cuts;

supporting point parts provided at respective ends of the arch part, the supporting point parts being provided by narrowing a distance between the parallel cuts at each end of the arch part;

bent cuts formed in the plate around the supporting point parts, respectively.

23. A ruler in which one pair of parallel slits are put in one raw material plate, an arch part, in which a part included between the one pair of parallel slits is bulged upward by a working means such as heating or pressure friction, is formed monolithically with the raw material plate, an expansion/contraction material such as sponge or rubber sheet is connected to an end of the arch part, and a strain is relieved by the expansion/contraction material.

* * * * *